United States Patent
Russell et al.

(10) Patent No.: US 9,015,747 B2
(45) Date of Patent: Apr. 21, 2015

(54) ADVERTISEMENT ROTATION

(75) Inventors: Riley R. Russell, San Mateo, CA (US); Glen van Datta, Austin, TX (US); Gary Zalewski, Oakland, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 61 days.

(21) Appl. No.: 13/191,398

(22) Filed: Jul. 26, 2011

(65) Prior Publication Data

US 2011/0307339 A1    Dec. 15, 2011

Related U.S. Application Data

(60) Division of application No. 12/190,323, filed on Aug. 12, 2008, which is a continuation of application No. PCT/US2007/011059, filed on May 7, 2007.

(60) Provisional application No. 60/798,381, filed on May 5, 2006.

(51) Int. Cl.
*H04N 7/10* (2006.01)
*H04N 7/025* (2006.01)
*G06Q 30/02* (2012.01)

(52) U.S. Cl.
CPC ............ *G06Q 30/02* (2013.01); *G06Q 30/0207* (2013.01); *G06Q 30/0269* (2013.01)

(58) Field of Classification Search
None
See application file for complete search history.

(56) References Cited

U.S. PATENT DOCUMENTS

| | | |
|---|---|---|
| 4,521,021 A | 6/1985 | Dixon |
| 4,542,897 A | 9/1985 | Melton et al. |
| 4,734,690 A | 3/1988 | Waller |
| 4,807,158 A | 2/1989 | Blanton et al. |
| 4,905,168 A | 2/1990 | McCarthy et al. |

(Continued)

FOREIGN PATENT DOCUMENTS

| | | |
|---|---|---|
| JP | 2001111921 | 4/2001 |
| JP | 2004-102475 | 4/2004 |
| WO | WO 98/51384 | 11/1998 |

OTHER PUBLICATIONS

U.S. Appl. No. 11/241,229 Final Office Action mailed Apr. 23, 2010.

(Continued)

*Primary Examiner* — Brian T Pendleton
*Assistant Examiner* — Ryan Stronczer
(74) *Attorney, Agent, or Firm* — Lewis Roca Rothgerber LLP

(57) ABSTRACT

A system and method for delivering content over a network is provided. Content may be primary content (e.g., music or a movie) or ancillary content (e.g., an advertisement). The ancillary content may further be classified as universal ancillary content that all users of the present system will receive; targeted ancillary content that particular users of the present system will receive; and context-specific ancillary content that users of the present system and viewing particular primary content will receive. The type of primary and/or ancillary content delivered to the user will depend, in part, on indicia of the user of a device receiving the content. The present invention seeks to ensure that a user has relevant and up-to-date ancillary content notwithstanding the nature or date of the primary content. Feedback data concerning the viewing of the ancillary content may also be generated such that a provider of the advertisement and/or product may provide targeted advertisements and improved products and services.

31 Claims, 6 Drawing Sheets

(56) References Cited

U.S. PATENT DOCUMENTS

| | | |
|---|---|---|
| 4,926,255 A | 5/1990 | Von Kohorn |
| 4,969,036 A | 11/1990 | Bhanu et al. |
| 5,014,234 A | 5/1991 | Edwards, Jr. |
| 5,083,271 A | 1/1992 | Thacher et al. |
| 5,105,184 A | 4/1992 | Pirani et al. |
| 5,227,874 A | 7/1993 | Von Kohorn |
| 5,231,568 A | 7/1993 | Cohen et al. |
| 5,283,731 A | 2/1994 | Lalonde et al. |
| 5,305,195 A | 4/1994 | Murphy |
| 5,305,389 A | 4/1994 | Palmer |
| 5,319,454 A | 6/1994 | Schutte |
| 5,347,632 A | 9/1994 | Filepp et al. |
| 5,373,440 A | 12/1994 | Cohen et al. |
| 5,377,997 A | 1/1995 | Wilden et al. |
| 5,446,919 A | 8/1995 | Wilkins |
| 5,462,275 A | 10/1995 | Lowe et al. |
| 5,497,479 A | 3/1996 | Hornbuckle |
| 5,512,935 A | 4/1996 | Majeti et al. |
| 5,526,041 A | 6/1996 | Glatt |
| 5,539,450 A | 7/1996 | Handelman |
| 5,548,645 A | 8/1996 | Ananda |
| 5,564,038 A | 10/1996 | Grantz et al. |
| 5,565,909 A | 10/1996 | Thibadeau et al. |
| 5,572,643 A | 11/1996 | Judson |
| 5,592,212 A | 1/1997 | Handelman |
| 5,630,757 A | 5/1997 | Gagin et al. |
| 5,636,346 A | 6/1997 | Saxe |
| 5,663,757 A | 9/1997 | Morales |
| 5,684,526 A | 11/1997 | Yoshinobu |
| 5,697,844 A | 12/1997 | Von Kohorn |
| 5,699,497 A | 12/1997 | Erdahl et al. |
| 5,707,289 A | 1/1998 | Watanabe et al. |
| 5,712,979 A | 1/1998 | Graber et al. |
| 5,721,827 A | 2/1998 | Logan et al. |
| 5,724,521 A | 3/1998 | Dedrick |
| 5,737,619 A | 4/1998 | Judson |
| 5,748,867 A | 5/1998 | Cosman et al. |
| 5,751,956 A | 5/1998 | Kirsch |
| 5,758,068 A | 5/1998 | Brandt et al. |
| 5,758,257 A | 5/1998 | Herz et al. |
| 5,771,347 A | 6/1998 | Grantz et al. |
| 5,774,170 A | 6/1998 | Hite et al. |
| 5,794,210 A | 8/1998 | Goldhaber et al. |
| 5,798,519 A | 8/1998 | Vock et al. |
| 5,805,815 A | 9/1998 | Hill |
| 5,822,523 A | 10/1998 | Rothschild et al. |
| 5,848,396 A | 12/1998 | Gerace |
| 5,855,008 A | 12/1998 | Goldhaber et al. |
| 5,857,149 A | 1/1999 | Suzuki |
| 5,860,073 A | 1/1999 | Ferrel et al. |
| 5,867,208 A | 2/1999 | McLaren |
| 5,876,286 A | 3/1999 | Lee |
| 5,879,235 A | 3/1999 | Kaneko et al. |
| 5,903,816 A | 5/1999 | Broadwin et al. |
| 5,910,987 A | 6/1999 | Ginter et al. |
| 5,911,582 A | 6/1999 | Redford |
| 5,916,024 A | 6/1999 | Von Kohorn |
| 5,917,725 A | 6/1999 | Thacher et al. |
| 5,929,850 A | 7/1999 | Broadwin et al. |
| 5,937,037 A | 8/1999 | Kamel et al. |
| 5,946,646 A | 8/1999 | Schena et al. |
| 5,946,664 A | 8/1999 | Ebisawa |
| 5,948,061 A | 9/1999 | Merriman et al. |
| 5,964,660 A | 10/1999 | James et al. |
| 5,970,143 A | 10/1999 | Schneier et al. |
| 5,974,398 A | 10/1999 | Hanson et al. |
| 5,987,511 A | 11/1999 | Elixmann et al. |
| 5,991,735 A | 11/1999 | Gerace |
| 6,005,602 A | 12/1999 | Matthews, III |
| 6,012,984 A | 1/2000 | Roseman |
| 6,015,348 A | 1/2000 | Lambright et al. |
| 6,020,883 A | 2/2000 | Herz et al. |
| 6,024,643 A | 2/2000 | Begis |
| 6,026,368 A | 2/2000 | Brown et al. |
| 6,029,046 A | 2/2000 | Khan et al. |
| 6,036,601 A | 3/2000 | Heckel |
| 6,047,289 A | 4/2000 | Thorne et al. |
| 6,088,722 A | 7/2000 | Herz et al. |
| 6,108,637 A | 8/2000 | Blumenau |
| 6,113,494 A | 9/2000 | Lennert |
| 6,119,098 A | 9/2000 | Guyot et al. |
| 6,149,519 A | 11/2000 | Osaki et al. |
| 6,151,631 A | 11/2000 | Ansell et al. |
| 6,165,070 A | 12/2000 | Nolte et al. |
| 6,179,713 B1 | 1/2001 | James et al. |
| 6,181,988 B1 | 1/2001 | Schneider et al. |
| 6,188,398 B1 | 2/2001 | Collins-Rector et al. |
| 6,196,920 B1 | 3/2001 | Spaur et al. |
| 6,199,082 B1 | 3/2001 | Ferrel et al. |
| 6,216,129 B1 | 4/2001 | Eldering |
| 6,236,975 B1 | 5/2001 | Boe et al. |
| 6,238,290 B1 | 5/2001 | Tarr et al. |
| 6,251,017 B1 | 6/2001 | Leason et al. |
| 6,263,360 B1 | 7/2001 | Arnold et al. |
| 6,264,555 B1 | 7/2001 | Glazman et al. |
| 6,264,560 B1 | 7/2001 | Goldberg et al. |
| 6,267,672 B1 | 7/2001 | Vance |
| 6,267,675 B1 | 7/2001 | Lee |
| 6,275,854 B1 | 8/2001 | Himmel et al. |
| 6,275,989 B1 | 8/2001 | Broadwin et al. |
| 6,298,348 B1 | 10/2001 | Eldering |
| 6,308,328 B1 | 10/2001 | Bowcutt et al. |
| 6,312,337 B1 | 11/2001 | Edwards et al. |
| 6,320,495 B1 | 11/2001 | Sporgis |
| 6,324,519 B1 | 11/2001 | Eldering |
| 6,343,990 B1 | 2/2002 | Rasmussen et al. |
| 6,346,045 B2 | 2/2002 | Rider et al. |
| 6,366,701 B1 | 4/2002 | Chalom et al. |
| 6,371,850 B1 | 4/2002 | Sonoda |
| 6,379,251 B1 | 4/2002 | Auxier et al. |
| 6,381,362 B1 | 4/2002 | Deshpande et al. |
| 6,385,592 B1 | 5/2002 | Angles et al. |
| 6,390,922 B1 | 5/2002 | Vange et al. |
| 6,393,574 B1 | 5/2002 | Kashiwagi et al. |
| 6,394,899 B1 | 5/2002 | Walker |
| 6,400,996 B1 | 6/2002 | Hoffberg et al. |
| 6,411,936 B1 | 6/2002 | Sanders |
| 6,434,614 B1 | 8/2002 | Blumenau |
| 6,443,843 B1 | 9/2002 | Walker et al. |
| 6,446,130 B1 | 9/2002 | Grapes |
| 6,446,261 B1 | 9/2002 | Rosser |
| 6,456,234 B1 | 9/2002 | Johnson |
| 6,457,010 B1 | 9/2002 | Eldering et al. |
| 6,460,036 B1 | 10/2002 | Herz |
| 6,468,155 B1 | 10/2002 | Zucker et al. |
| 6,470,138 B1 | 10/2002 | Um et al. |
| 6,484,148 B1 | 11/2002 | Boyd |
| 6,484,149 B1 | 11/2002 | Jammes et al. |
| 6,489,955 B1 | 12/2002 | Newhall, Jr. |
| 6,496,826 B1 | 12/2002 | Chowdhury et al. |
| 6,513,160 B2 | 1/2003 | Dureau |
| 6,516,338 B1 | 2/2003 | Landsman et al. |
| 6,529,940 B1 | 3/2003 | Humble |
| 6,530,840 B1 | 3/2003 | Cuomo et al. |
| 6,532,448 B1 | 3/2003 | Higginson et al. |
| 6,539,375 B2 | 3/2003 | Kawasaki |
| 6,539,544 B2 | 3/2003 | Ebisawa |
| 6,553,178 B2 | 4/2003 | Abecassis |
| 6,560,578 B2 | 5/2003 | Eldering |
| 6,563,523 B1 | 5/2003 | Suchocki et al. |
| 6,564,217 B2 | 5/2003 | Bunney et al. |
| 6,595,859 B2 | 7/2003 | Lynn |
| 6,606,746 B1 | 8/2003 | Zdepski et al. |
| 6,611,812 B2 | 8/2003 | Hurtado et al. |
| 6,611,813 B1 | 8/2003 | Bratton |
| 6,611,957 B2 | 8/2003 | Ebisawa |
| 6,612,932 B2 | 9/2003 | Stern |
| 6,615,039 B1 | 9/2003 | Eldering |
| 6,616,533 B1 | 9/2003 | Rashkovskiy |
| 6,625,578 B2 | 9/2003 | Spaur et al. |
| 6,632,138 B1 | 10/2003 | Serizawa et al. |
| 6,640,097 B2 | 10/2003 | Corrigan et al. |
| 6,640,335 B2 | 10/2003 | Ebisawa |
| 6,640,336 B1 | 10/2003 | Ebisawa |

(56) References Cited

U.S. PATENT DOCUMENTS

| | | |
|---|---|---|
| 6,645,068 B1 | 11/2003 | Kelly et al. |
| 6,654,725 B1 | 11/2003 | Langheinrich et al. |
| 6,656,050 B2 | 12/2003 | Busch et al. |
| 6,659,861 B1 | 12/2003 | Faris et al. |
| 6,663,105 B1 | 12/2003 | Sullivan et al. |
| 6,669,562 B1 | 12/2003 | Shiino |
| 6,669,564 B1 | 12/2003 | Young et al. |
| 6,680,746 B2 | 1/2004 | Kawai et al. |
| 6,683,941 B2 | 1/2004 | Brown et al. |
| 6,684,194 B1 | 1/2004 | Eldering et al. |
| 6,687,608 B2 | 2/2004 | Sugimoto et al. |
| 6,697,792 B2 | 2/2004 | Bunney et al. |
| 6,698,020 B1 | 2/2004 | Zigmond et al. |
| 6,699,127 B1 | 3/2004 | Lobb et al. |
| 6,701,363 B1 | 3/2004 | Chiu et al. |
| 6,704,930 B1 | 3/2004 | Eldering et al. |
| 6,709,335 B1 | 3/2004 | Bates et al. |
| 6,712,702 B2 | 3/2004 | Goldberg et al. |
| 6,714,236 B1 | 3/2004 | Wada et al. |
| 6,714,723 B2 | 3/2004 | Abecassis |
| 6,714,917 B1 | 3/2004 | Eldering et al. |
| 6,716,103 B1 | 4/2004 | Eck et al. |
| 6,718,551 B1 | 4/2004 | Swix et al. |
| 6,721,748 B1 | 4/2004 | Knight et al. |
| 6,731,238 B2 | 5/2004 | Johnson |
| 6,738,078 B1 | 5/2004 | Duncombe |
| 6,745,011 B1 | 6/2004 | Hendrickson et al. |
| 6,757,740 B1 | 6/2004 | Parekh et al. |
| 6,758,746 B1 | 7/2004 | Hunter et al. |
| 6,758,754 B1 | 7/2004 | Lavanchy et al. |
| 6,758,755 B2 | 7/2004 | Kelly et al. |
| 6,764,395 B1 | 7/2004 | Guyett |
| 6,764,403 B2 | 7/2004 | Gavin |
| 6,771,290 B1 | 8/2004 | Hoyle |
| 6,783,460 B2 | 8/2004 | Galyean, III et al. |
| 6,785,902 B1 | 8/2004 | Zigmond et al. |
| 6,814,663 B2 | 11/2004 | Edwards et al. |
| 6,820,277 B1 | 11/2004 | Eldering et al. |
| 6,826,614 B1 | 11/2004 | Hanmann et al. |
| 6,827,645 B2 | 12/2004 | Morita et al. |
| 6,840,861 B2 | 1/2005 | Jordan et al. |
| 6,863,612 B2 | 3/2005 | Willis |
| 6,874,683 B2 | 4/2005 | Keronen et al. |
| 6,882,978 B2 | 4/2005 | Ebisawa |
| 6,890,256 B2 | 5/2005 | Walker et al. |
| 6,895,170 B1 | 5/2005 | Lambert et al. |
| 6,912,398 B1 | 6/2005 | Domnitz |
| 6,928,414 B1 | 8/2005 | Kim |
| 6,941,574 B1 | 9/2005 | Broadwin et al. |
| 6,942,575 B2 | 9/2005 | Mergler |
| 6,954,728 B1 | 10/2005 | Kusumoto |
| 6,955,605 B2 | 10/2005 | Young et al. |
| 6,964,608 B1 | 11/2005 | Koza |
| 6,967,566 B2 | 11/2005 | Weston et al. |
| 6,968,567 B1 | 11/2005 | Gordon et al. |
| 6,970,834 B2 | 11/2005 | Martin et al. |
| 6,970,915 B1 | 11/2005 | Partovi et al. |
| 6,973,664 B2 | 12/2005 | Fries |
| 6,987,221 B2 | 1/2006 | Platt |
| 6,995,788 B2 | 2/2006 | James |
| 7,028,082 B1 | 4/2006 | Rosenberg et al. |
| 7,072,849 B1 | 7/2006 | Filepp et al. |
| 7,086,187 B2 | 8/2006 | Bandak |
| 7,136,871 B2 | 11/2006 | Ozer et al. |
| 7,305,442 B1 | 12/2007 | Lundy |
| 7,362,999 B2 | 4/2008 | Petschke et al. |
| 7,363,643 B2 | 4/2008 | Drake et al. |
| 7,370,002 B2 | 5/2008 | Heckerman et al. |
| 7,370,073 B2 | 5/2008 | Yen et al. |
| 7,386,127 B2 | 6/2008 | Bar-On |
| 7,401,140 B2 | 7/2008 | Goulden et al. |
| 7,421,454 B2 | 9/2008 | DeShan et al. |
| 7,437,368 B1 | 10/2008 | Kolluri et al. |
| 7,466,823 B2 | 12/2008 | Vestergaard et al. |
| 7,487,112 B2 | 2/2009 | Barnes, Jr. |
| 7,594,189 B1 | 9/2009 | Walker et al. |
| 7,707,485 B2 * | 4/2010 | Laksono ............... 715/201 |
| 8,005,713 B1 | 8/2011 | Sanz-Pastor et al. |
| 8,024,766 B2 | 9/2011 | Addington |
| 8,074,076 B2 | 12/2011 | Courtois |
| 8,175,921 B1 | 5/2012 | Kopra |
| 8,191,088 B2 | 5/2012 | Edwards et al. |
| 8,267,783 B2 | 9/2012 | van Datta |
| 8,272,964 B2 | 9/2012 | van Datta |
| 8,302,030 B2 | 10/2012 | Soroca et al. |
| 8,574,074 B2 | 11/2013 | van Datta |
| 8,626,584 B2 | 1/2014 | van Datta |
| 8,645,992 B2 | 2/2014 | Russell |
| 8,676,900 B2 | 3/2014 | Yruski |
| 8,751,310 B2 | 6/2014 | van Datta |
| 8,763,090 B2 | 6/2014 | Capati |
| 8,763,157 B2 | 6/2014 | Navar |
| 8,769,558 B2 | 7/2014 | Navar |
| 8,795,076 B2 | 8/2014 | van Datta |
| 2001/0011226 A1 | 8/2001 | Greer et al. |
| 2001/0013009 A1 | 8/2001 | Greening et al. |
| 2001/0014915 A1 | 8/2001 | Blumenau |
| 2001/0025245 A1 | 9/2001 | Flickinger et al. |
| 2001/0025254 A1 | 9/2001 | Park |
| 2001/0025274 A1 | 9/2001 | Zehr et al. |
| 2001/0027412 A1 | 10/2001 | Son |
| 2001/0032125 A1 | 10/2001 | Bhan et al. |
| 2001/0032132 A1 | 10/2001 | Moran |
| 2001/0032133 A1 | 10/2001 | Moran |
| 2001/0032137 A1 | 10/2001 | Bennett et al. |
| 2001/0032333 A1 | 10/2001 | Flickinger |
| 2001/0034643 A1 | 10/2001 | Acres |
| 2001/0034762 A1 | 10/2001 | Jacobs et al. |
| 2001/0037232 A1 | 11/2001 | Miller |
| 2001/0039210 A1 | 11/2001 | St-Denis |
| 2001/0047297 A1 | 11/2001 | Wen |
| 2001/0049620 A1 | 12/2001 | Blasko |
| 2001/0052123 A1 | 12/2001 | Kawai |
| 2002/0004743 A1 | 1/2002 | Kutaragi et al. |
| 2002/0004744 A1 | 1/2002 | Muyres et al. |
| 2002/0007307 A1 | 1/2002 | Miller et al. |
| 2002/0007310 A1 | 1/2002 | Long |
| 2002/0010626 A1 | 1/2002 | Agmoni |
| 2002/0010628 A1 | 1/2002 | Burns |
| 2002/0010757 A1 | 1/2002 | Granik et al. |
| 2002/0013174 A1 | 1/2002 | Murata |
| 2002/0018076 A1 | 2/2002 | Gianola |
| 2002/0018982 A1 | 2/2002 | Conroy |
| 2002/0019774 A1 | 2/2002 | Kanter |
| 2002/0022476 A1 | 2/2002 | Go |
| 2002/0022516 A1 | 2/2002 | Forden |
| 2002/0023000 A1 | 2/2002 | Bollay |
| 2002/0026345 A1 | 2/2002 | Juels |
| 2002/0026355 A1 | 2/2002 | Mitsuoka et al. |
| 2002/0026638 A1 | 2/2002 | Eldering et al. |
| 2002/0032608 A1 | 3/2002 | Kanter |
| 2002/0032626 A1 | 3/2002 | DeWolf et al. |
| 2002/0032906 A1 | 3/2002 | Grossman |
| 2002/0044687 A1 | 4/2002 | Federman |
| 2002/0046087 A1 | 4/2002 | Hey |
| 2002/0046095 A1 | 4/2002 | Wallace |
| 2002/0046102 A1 | 4/2002 | Dohring et al. |
| 2002/0049968 A1 | 4/2002 | Wilson et al. |
| 2002/0051521 A1 | 5/2002 | Patrick |
| 2002/0055833 A1 | 5/2002 | Sterling |
| 2002/0055876 A1 | 5/2002 | Gabler |
| 2002/0056107 A1 | 5/2002 | Schlack |
| 2002/0059577 A1 | 5/2002 | Lu et al. |
| 2002/0059590 A1 | 5/2002 | Kitsukawa et al. |
| 2002/0059610 A1 | 5/2002 | Ellis |
| 2002/0061778 A1 | 5/2002 | Acres |
| 2002/0067730 A1 | 6/2002 | Hinderks et al. |
| 2002/0069240 A1 | 6/2002 | Berk |
| 2002/0069405 A1 | 6/2002 | Chapin et al. |
| 2002/0072965 A1 | 6/2002 | Merriman et al. |
| 2002/0072966 A1 | 6/2002 | Eldering et al. |
| 2002/0073235 A1 | 6/2002 | Chen et al. |
| 2002/0077906 A1 | 6/2002 | Remler |
| 2002/0078441 A1 | 6/2002 | Drake et al. |

(56) References Cited

U.S. PATENT DOCUMENTS

| | | |
|---|---|---|
| 2002/0078444 A1 | 6/2002 | Krewin et al. |
| 2002/0082077 A1 | 6/2002 | Johnson et al. |
| 2002/0082910 A1 | 6/2002 | Kontogouris |
| 2002/0082913 A1 | 6/2002 | Li |
| 2002/0082941 A1 | 6/2002 | Bird |
| 2002/0083435 A1 | 6/2002 | Blasko et al. |
| 2002/0083439 A1 | 6/2002 | Eldering |
| 2002/0083441 A1 | 6/2002 | Flickinger et al. |
| 2002/0083442 A1 | 6/2002 | Eldering |
| 2002/0083443 A1* | 6/2002 | Eldering et al. ............ 725/34 |
| 2002/0083444 A1 | 6/2002 | Blasko et al. |
| 2002/0083445 A1 | 6/2002 | Flickinger et al. |
| 2002/0083451 A1 | 6/2002 | Gill et al. |
| 2002/0087402 A1 | 7/2002 | Zustak |
| 2002/0087403 A1 | 7/2002 | Meyers et al. |
| 2002/0087887 A1 | 7/2002 | Busam et al. |
| 2002/0087973 A1 | 7/2002 | Hamilton et al. |
| 2002/0087975 A1 | 7/2002 | Schlack |
| 2002/0087980 A1 | 7/2002 | Eldering et al. |
| 2002/0094868 A1 | 7/2002 | Tuck et al. |
| 2002/0095676 A1 | 7/2002 | Knee et al. |
| 2002/0098891 A1 | 7/2002 | Graham et al. |
| 2002/0099600 A1 | 7/2002 | Merriman et al. |
| 2002/0099611 A1 | 7/2002 | De Souza et al. |
| 2002/0099653 A1 | 7/2002 | De Souza et al. |
| 2002/0100040 A1 | 7/2002 | Bull |
| 2002/0107073 A1 | 8/2002 | Binney |
| 2002/0107075 A1 | 8/2002 | Stephan |
| 2002/0107730 A1 | 8/2002 | Bernstein |
| 2002/0109680 A1 | 8/2002 | Orbanes et al. |
| 2002/0111154 A1 | 8/2002 | Eldering et al. |
| 2002/0111172 A1 | 8/2002 | De Wolf et al. |
| 2002/0111825 A1 | 8/2002 | Martin et al. |
| 2002/0111865 A1 | 8/2002 | Middleton, III et al. |
| 2002/0112035 A1 | 8/2002 | Carey et al. |
| 2002/0112233 A1 | 8/2002 | Cantu Bonilla et al. |
| 2002/0112240 A1 | 8/2002 | Bacso et al. |
| 2002/0112249 A1 | 8/2002 | Hendricks et al. |
| 2002/0112250 A1 | 8/2002 | Koplar et al. |
| 2002/0114466 A1 | 8/2002 | Tanaka et al. |
| 2002/0116284 A1 | 8/2002 | Steelman et al. |
| 2002/0120589 A1 | 8/2002 | Aoki |
| 2002/0122052 A1 | 9/2002 | Reich et al. |
| 2002/0123928 A1 | 9/2002 | Eldering et al. |
| 2002/0129368 A1 | 9/2002 | Schlack et al. |
| 2002/0133398 A1 | 9/2002 | Geller et al. |
| 2002/0136407 A1 | 9/2002 | Denning et al. |
| 2002/0138493 A1 | 9/2002 | Shapiro et al. |
| 2002/0143639 A1 | 10/2002 | Beckett et al. |
| 2002/0143652 A1 | 10/2002 | Beckett |
| 2002/0143782 A1 | 10/2002 | Headings et al. |
| 2002/0143901 A1 | 10/2002 | Lupo et al. |
| 2002/0144262 A1 | 10/2002 | Plotnick et al. |
| 2002/0144263 A1 | 10/2002 | Eldering et al. |
| 2002/0147633 A1 | 10/2002 | Rafizadeh |
| 2002/0147638 A1 | 10/2002 | Banerjee et al. |
| 2002/0147645 A1 | 10/2002 | Alao et al. |
| 2002/0152117 A1 | 10/2002 | Cristofalo et al. |
| 2002/0155878 A1 | 10/2002 | Lert, Jr. et al. |
| 2002/0155891 A1 | 10/2002 | Okada et al. |
| 2002/0157002 A1 | 10/2002 | Messerges et al. |
| 2002/0161625 A1 | 10/2002 | Brito-Valladares et al. |
| 2002/0161639 A1 | 10/2002 | Goldstein |
| 2002/0164977 A1 | 11/2002 | Link II et al. |
| 2002/0164999 A1 | 11/2002 | Johnson |
| 2002/0165026 A1 | 11/2002 | Perkins et al. |
| 2002/0165764 A1 | 11/2002 | Wade et al. |
| 2002/0173349 A1 | 11/2002 | Ach, III |
| 2002/0173359 A1 | 11/2002 | Gallo et al. |
| 2002/0175936 A1 | 11/2002 | Tenembaum |
| 2002/0178442 A1 | 11/2002 | Williams |
| 2002/0178445 A1 | 11/2002 | Eldering et al. |
| 2002/0178447 A1 | 11/2002 | Plotnick et al. |
| 2002/0184047 A1 | 12/2002 | Plotnick et al. |
| 2002/0184086 A1 | 12/2002 | Linde |
| 2002/0184088 A1 | 12/2002 | Rosenberg |
| 2002/0184130 A1 | 12/2002 | Blasko |
| 2002/0184642 A1 | 12/2002 | Lude et al. |
| 2002/0193066 A1 | 12/2002 | Connelly |
| 2002/0194058 A1 | 12/2002 | Eldering |
| 2002/0194585 A1 | 12/2002 | Connelly |
| 2002/0194590 A1 | 12/2002 | Pong |
| 2002/0194598 A1 | 12/2002 | Connelly |
| 2002/0194607 A1 | 12/2002 | Connelly |
| 2003/0004810 A1 | 1/2003 | Eldering |
| 2003/0009762 A1 | 1/2003 | Hooper et al. |
| 2003/0014307 A1 | 1/2003 | Heng |
| 2003/0014312 A1 | 1/2003 | Fleisher |
| 2003/0014414 A1 | 1/2003 | Newman |
| 2003/0014754 A1 | 1/2003 | Chang |
| 2003/0018527 A1 | 1/2003 | Filepp et al. |
| 2003/0018797 A1 | 1/2003 | Dunning et al. |
| 2003/0028433 A1 | 2/2003 | Merriman et al. |
| 2003/0033405 A1 | 2/2003 | Perdon et al. |
| 2003/0035075 A1 | 2/2003 | Butler et al. |
| 2003/0036944 A1 | 2/2003 | Lesandrini et al. |
| 2003/0046148 A1 | 3/2003 | Rizzi et al. |
| 2003/0048293 A1 | 3/2003 | Werkhoven |
| 2003/0054888 A1 | 3/2003 | Walker et al. |
| 2003/0060247 A1 | 3/2003 | Goldberg et al. |
| 2003/0066092 A1* | 4/2003 | Wagner et al. ............ 725/136 |
| 2003/0070167 A1 | 4/2003 | Holtz et al. |
| 2003/0073496 A1 | 4/2003 | D'Amico et al. |
| 2003/0074252 A1 | 4/2003 | Chandler-Pepelnjak et al. |
| 2003/0076347 A1 | 4/2003 | Barrett et al. |
| 2003/0079226 A1 | 4/2003 | Barrett |
| 2003/0084449 A1 | 5/2003 | Chane et al. |
| 2003/0084456 A1 | 5/2003 | Ryan et al. |
| 2003/0093311 A1 | 5/2003 | Knowlson |
| 2003/0100375 A1 | 5/2003 | Wakae et al. |
| 2003/0101449 A1 | 5/2003 | Bentolila et al. |
| 2003/0101451 A1 | 5/2003 | Bentolila et al. |
| 2003/0101454 A1 | 5/2003 | Ozer et al. |
| 2003/0103644 A1 | 6/2003 | Klayh |
| 2003/0104867 A1 | 6/2003 | Kobayashi et al. |
| 2003/0110131 A1 | 6/2003 | Alain et al. |
| 2003/0110171 A1 | 6/2003 | Ozer et al. |
| 2003/0110499 A1 | 6/2003 | Knudson et al. |
| 2003/0115074 A1 | 6/2003 | Freeman et al. |
| 2003/0115318 A1 | 6/2003 | Wueste |
| 2003/0115587 A1 | 6/2003 | Kendall et al. |
| 2003/0126150 A1 | 7/2003 | Chan |
| 2003/0135513 A1 | 7/2003 | Quinn et al. |
| 2003/0139966 A1 | 7/2003 | Sirota et al. |
| 2003/0144044 A1 | 7/2003 | Piarsky |
| 2003/0144048 A1 | 7/2003 | Silva |
| 2003/0149618 A1 | 8/2003 | Sender et al. |
| 2003/0149623 A1 | 8/2003 | Chen |
| 2003/0149938 A1 | 8/2003 | McElfresh et al. |
| 2003/0149975 A1 | 8/2003 | Eldering et al. |
| 2003/0158872 A1 | 8/2003 | Adams |
| 2003/0163369 A1 | 8/2003 | Arr |
| 2003/0163482 A1 | 8/2003 | Bunney et al. |
| 2003/0171988 A1 | 9/2003 | Sugihara |
| 2003/0171990 A1 | 9/2003 | Rao et al. |
| 2003/0172376 A1 | 9/2003 | Coffin, III |
| 2003/0177490 A1 | 9/2003 | Hoshino et al. |
| 2003/0182567 A1 | 9/2003 | Barton et al. |
| 2003/0182663 A1 | 9/2003 | Gudorf et al. |
| 2003/0187719 A1 | 10/2003 | Brocklebank |
| 2003/0190961 A1 | 10/2003 | Seidman |
| 2003/0191690 A1 | 10/2003 | McIntyre et al. |
| 2003/0191742 A1 | 10/2003 | Yonezawa et al. |
| 2003/0195021 A1 | 10/2003 | Yamashita et al. |
| 2003/0195801 A1 | 10/2003 | Takakura et al. |
| 2003/0195837 A1 | 10/2003 | Kostic et al. |
| 2003/0199292 A1 | 10/2003 | Greenberg |
| 2003/0200452 A1 | 10/2003 | Tagawa et al. |
| 2003/0204632 A1 | 10/2003 | Willebeek-LeMair et al. |
| 2003/0212608 A1 | 11/2003 | Cliff |
| 2003/0215211 A1 | 11/2003 | Coffin, III |
| 2003/0216961 A1 | 11/2003 | Barry |
| 2003/0226141 A1 | 12/2003 | Krasnow et al. |
| 2003/0226142 A1 | 12/2003 | Rand |

(56) References Cited

U.S. PATENT DOCUMENTS

| | | |
|---|---|---|
| 2003/0229893 A1 | 12/2003 | Sgaraglino |
| 2004/0002380 A1 | 1/2004 | Brosnan et al. |
| 2004/0003396 A1 | 1/2004 | Babu |
| 2004/0014454 A1 | 1/2004 | Burgess et al. |
| 2004/0015397 A1 | 1/2004 | Barry et al. |
| 2004/0015608 A1 | 1/2004 | Ellis et al. |
| 2004/0019521 A1 | 1/2004 | Birmingham |
| 2004/0025174 A1 | 2/2004 | Cerrato |
| 2004/0030595 A1 | 2/2004 | Park |
| 2004/0034536 A1 | 2/2004 | Hughes |
| 2004/0034686 A1 | 2/2004 | Guthrie |
| 2004/0039648 A1 | 2/2004 | Candelore et al. |
| 2004/0039796 A1 | 2/2004 | Watkins |
| 2004/0043817 A1 | 3/2004 | Willis |
| 2004/0043819 A1 | 3/2004 | Willis |
| 2004/0044567 A1 | 3/2004 | Willis |
| 2004/0044569 A1 | 3/2004 | Roberts et al. |
| 2004/0044571 A1 | 3/2004 | Bronnimann et al. |
| 2004/0044574 A1 | 3/2004 | Cochran et al. |
| 2004/0054589 A1 | 3/2004 | Nicolas et al. |
| 2004/0057348 A1 | 3/2004 | Shteyn et al. |
| 2004/0059625 A1 | 3/2004 | Schrader |
| 2004/0068552 A1 | 4/2004 | Kotz et al. |
| 2004/0073482 A1 | 4/2004 | Wiggins et al. |
| 2004/0078263 A1 | 4/2004 | Altieri |
| 2004/0078266 A1 | 4/2004 | Kim |
| 2004/0078292 A1 | 4/2004 | Blumenau |
| 2004/0078809 A1 | 4/2004 | Drazin |
| 2004/0083133 A1 | 4/2004 | Nicholas et al. |
| 2004/0088583 A1 | 5/2004 | Yoon et al. |
| 2004/0102248 A1 | 5/2004 | Young et al. |
| 2004/0103024 A1 | 5/2004 | Patel et al. |
| 2004/0103429 A1 | 5/2004 | Carlucci et al. |
| 2004/0107136 A1 | 6/2004 | Nemirofsky et al. |
| 2004/0110565 A1 | 6/2004 | Levesque |
| 2004/0111317 A1 | 6/2004 | Ebisawa |
| 2004/0111484 A1 | 6/2004 | Young et al. |
| 2004/0116183 A1 | 6/2004 | Prindle |
| 2004/0117272 A1 | 6/2004 | Shehab |
| 2004/0121835 A1 | 6/2004 | Willis et al. |
| 2004/0121842 A1 | 6/2004 | Willis et al. |
| 2004/0126747 A1 | 7/2004 | Fujisawa et al. |
| 2004/0133480 A1 | 7/2004 | Domes |
| 2004/0133518 A1 | 7/2004 | Dryall |
| 2004/0137980 A1 | 7/2004 | Aenlle |
| 2004/0139465 A1 | 7/2004 | Matthews, III et al. |
| 2004/0140352 A1 | 7/2004 | Walker et al. |
| 2004/0143478 A1 | 7/2004 | Ward |
| 2004/0143495 A1 | 7/2004 | Koenig |
| 2004/0148221 A1 | 7/2004 | Chu |
| 2004/0148424 A1 | 7/2004 | Berkson et al. |
| 2004/0148625 A1 | 7/2004 | Eldering et al. |
| 2004/0152517 A1 | 8/2004 | Hardisty et al. |
| 2004/0152518 A1 | 8/2004 | Kogo |
| 2004/0153360 A1 | 8/2004 | Schumann |
| 2004/0153363 A1 | 8/2004 | Stehling |
| 2004/0153385 A1 | 8/2004 | Allibhoy et al. |
| 2004/0153453 A1 | 8/2004 | Brodie et al. |
| 2004/0158858 A1 | 8/2004 | Paxton |
| 2004/0162758 A1 | 8/2004 | Willis |
| 2004/0162759 A1 | 8/2004 | Willis |
| 2004/0163101 A1 | 8/2004 | Swix et al. |
| 2004/0163134 A1 | 8/2004 | Willis |
| 2004/0168063 A1 | 8/2004 | Revital et al. |
| 2004/0168188 A1* | 8/2004 | Bennington et al. ............ 725/41 |
| 2004/0168202 A1 | 8/2004 | Ebihara |
| 2004/0169678 A1 | 9/2004 | Oliver |
| 2004/0172324 A1 | 9/2004 | Merriman et al. |
| 2004/0172331 A1 | 9/2004 | Merriman et al. |
| 2004/0172332 A1 | 9/2004 | Merriman et al. |
| 2004/0172343 A1 | 9/2004 | Allibhoy et al. |
| 2004/0176170 A1 | 9/2004 | Eck et al. |
| 2004/0176995 A1 | 9/2004 | Fusz |
| 2004/0177001 A1 | 9/2004 | Salinas |
| 2004/0181808 A1 | 9/2004 | Schaefer et al. |
| 2004/0186766 A1 | 9/2004 | Fellenstein et al. |
| 2004/0186771 A1 | 9/2004 | Squires |
| 2004/0193488 A1 | 9/2004 | Khoo et al. |
| 2004/0194123 A1 | 9/2004 | Fredlund et al. |
| 2004/0194128 A1 | 9/2004 | McIntyre et al. |
| 2004/0201629 A1 | 10/2004 | Bates et al. |
| 2004/0204238 A1 | 10/2004 | Aoki |
| 2004/0204247 A1 | 10/2004 | Walker et al. |
| 2004/0205157 A1 | 10/2004 | Bibelnieks et al. |
| 2004/0205508 A1 | 10/2004 | Wecker et al. |
| 2004/0205807 A1 | 10/2004 | Wilcoxson et al. |
| 2004/0210472 A1 | 10/2004 | Lew et al. |
| 2004/0210489 A1 | 10/2004 | Jackson et al. |
| 2004/0210661 A1 | 10/2004 | Thompson |
| 2004/0210824 A1 | 10/2004 | Shoff et al. |
| 2004/0219977 A1 | 11/2004 | Ebisawa |
| 2004/0220850 A1 | 11/2004 | Ferrer et al. |
| 2004/0221018 A1 | 11/2004 | Ji |
| 2004/0224772 A1 | 11/2004 | Canessa et al. |
| 2004/0225562 A1 | 11/2004 | Turner |
| 2004/0225715 A1 | 11/2004 | Gottfried |
| 2004/0230593 A1 | 11/2004 | Rudin et al. |
| 2004/0230994 A1 | 11/2004 | Urdang et al. |
| 2004/0234932 A1 | 11/2004 | Hughes et al. |
| 2004/0236585 A1 | 11/2004 | Kohnke et al. |
| 2004/0243455 A1 | 12/2004 | Smith |
| 2004/0243466 A1 | 12/2004 | Trzybinski et al. |
| 2004/0243470 A1 | 12/2004 | Ozer et al. |
| 2004/0243623 A1 | 12/2004 | Ozer et al. |
| 2004/0248649 A1 | 12/2004 | Arai et al. |
| 2004/0249786 A1 | 12/2004 | Dabney et al. |
| 2004/0252051 A1 | 12/2004 | Johnson |
| 2004/0254831 A1 | 12/2004 | Dean |
| 2004/0254957 A1 | 12/2004 | Hyotyniemi et al. |
| 2004/0255148 A1 | 12/2004 | Monteiro et al. |
| 2004/0259553 A1 | 12/2004 | Delaney et al. |
| 2004/0260609 A1 | 12/2004 | Loeb et al. |
| 2004/0261125 A1 | 12/2004 | Ellis et al. |
| 2004/0266535 A1 | 12/2004 | Reeves |
| 2004/0266537 A1 | 12/2004 | Morris |
| 2004/0267611 A1 | 12/2004 | Hoerenz |
| 2005/0005242 A1 | 1/2005 | Hoyle |
| 2005/0015267 A1 | 1/2005 | Barringer et al. |
| 2005/0021387 A1 | 1/2005 | Gottfurcht |
| 2005/0021396 A1 | 1/2005 | Pearch et al. |
| 2005/0021397 A1 | 1/2005 | Cui et al. |
| 2005/0021403 A1 | 1/2005 | Ozer et al. |
| 2005/0021465 A1 | 1/2005 | Segerstrom |
| 2005/0021470 A1 | 1/2005 | Martin et al. |
| 2005/0021853 A1 | 1/2005 | Parekh et al. |
| 2005/0027587 A1 | 2/2005 | Latona et al. |
| 2005/0027595 A1 | 2/2005 | Ha et al. |
| 2005/0027699 A1 | 2/2005 | Awadallah et al. |
| 2005/0028188 A1 | 2/2005 | Latona et al. |
| 2005/0028195 A1 | 2/2005 | Feinleib et al. |
| 2005/0032577 A1 | 2/2005 | Blackburn et al. |
| 2005/0033700 A1 | 2/2005 | Vogler et al. |
| 2005/0038698 A1 | 2/2005 | Lukose et al. |
| 2005/0038702 A1 | 2/2005 | Merriman et al. |
| 2005/0050070 A1 | 3/2005 | Sheldon |
| 2005/0055725 A1 | 3/2005 | Stewart |
| 2005/0060264 A1 | 3/2005 | Shrock et al. |
| 2005/0075155 A1 | 4/2005 | Sitrick |
| 2005/0075172 A1 | 4/2005 | Coleman |
| 2005/0076051 A1 | 4/2005 | Carobus et al. |
| 2005/0091107 A1 | 4/2005 | Blum |
| 2005/0091108 A1 | 4/2005 | Frost |
| 2005/0091111 A1 | 4/2005 | Green et al. |
| 2005/0096975 A1 | 5/2005 | Moshe |
| 2005/0096983 A1 | 5/2005 | Werkhoven |
| 2005/0097622 A1 | 5/2005 | Zigmond et al. |
| 2005/0101386 A1 | 5/2005 | Lavanchy et al. |
| 2005/0102177 A1 | 5/2005 | Takayama |
| 2005/0102202 A1 | 5/2005 | Linden et al. |
| 2005/0107158 A1 | 5/2005 | Kanisawa et al. |
| 2005/0108095 A1 | 5/2005 | Perlmutter |
| 2005/0113170 A1 | 5/2005 | McHugh |
| 2005/0114526 A1 | 5/2005 | Aoyama |
| 2005/0125286 A1 | 6/2005 | Crippen et al. |

(56) References Cited

U.S. PATENT DOCUMENTS

| | | | |
|---|---|---|---|
| 2005/0125528 A1 | 6/2005 | Burke et al. | |
| 2005/0130725 A1 | 6/2005 | Creamer et al. | |
| 2005/0143174 A1 | 6/2005 | Goldman et al. | |
| 2005/0144063 A1 | 6/2005 | Spector | |
| 2005/0144073 A1 | 6/2005 | Morrisroe et al. | |
| 2005/0149396 A1 | 7/2005 | Horowitz et al. | |
| 2005/0149397 A1 | 7/2005 | Morgenstern et al. | |
| 2005/0153760 A1 | 7/2005 | Varley | |
| 2005/0154640 A1 | 7/2005 | Kolluri et al. | |
| 2005/0154717 A1 | 7/2005 | Watson et al. | |
| 2005/0155056 A1 | 7/2005 | Knee et al. | |
| 2005/0155083 A1 | 7/2005 | Oh et al. | |
| 2005/0160442 A1 | 7/2005 | Kaplowitz | |
| 2005/0164757 A1 | 7/2005 | Ebisawa | |
| 2005/0165640 A1 | 7/2005 | Kotorov | |
| 2005/0165644 A1 | 7/2005 | Beyda et al. | |
| 2005/0171865 A1 | 8/2005 | Beardow | |
| 2005/0177413 A1 | 8/2005 | Blumberg et al. | |
| 2005/0177430 A1 | 8/2005 | Willis | |
| 2005/0177431 A1 | 8/2005 | Willis et al. | |
| 2005/0177461 A1 | 8/2005 | Rosefelt et al. | |
| 2005/0178940 A1 | 8/2005 | Granick | |
| 2005/0179685 A1 | 8/2005 | Kake et al. | |
| 2005/0182693 A1 | 8/2005 | Alivandi | |
| 2005/0182737 A1 | 8/2005 | Brown | |
| 2005/0185825 A1 | 8/2005 | Hoshino et al. | |
| 2005/0192071 A1 | 9/2005 | Matsuno et al. | |
| 2005/0192864 A1 | 9/2005 | Ganz | |
| 2005/0193411 A1 | 9/2005 | Funston | |
| 2005/0193425 A1 | 9/2005 | Sull et al. | |
| 2005/0195157 A1 | 9/2005 | Kramer et al. | |
| 2005/0202385 A1 | 9/2005 | Coward et al. | |
| 2005/0203804 A1 | 9/2005 | Suzuki et al. | |
| 2005/0203811 A1 | 9/2005 | David | |
| 2005/0204381 A1 | 9/2005 | Ludvig et al. | |
| 2005/0216346 A1 | 9/2005 | Kusumoto et al. | |
| 2005/0216348 A1 | 9/2005 | Martin et al. | |
| 2005/0216581 A1 | 9/2005 | Blumenau et al. | |
| 2005/0222908 A1 | 10/2005 | Altberg et al. | |
| 2005/0227749 A1 | 10/2005 | Bender et al. | |
| 2005/0228797 A1 | 10/2005 | Koningstein et al. | |
| 2005/0235030 A1 | 10/2005 | Lauckhart et al. | |
| 2005/0235199 A1 | 10/2005 | Adams | |
| 2005/0235310 A1 | 10/2005 | Bies | |
| 2005/0235318 A1 | 10/2005 | Grauch et al. | |
| 2005/0240476 A1 | 10/2005 | Bigott | |
| 2005/0240961 A1 | 10/2005 | Jerding et al. | |
| 2005/0246736 A1 | 11/2005 | Beyda et al. | |
| 2005/0247769 A1 | 11/2005 | Potter et al. | |
| 2005/0251539 A1 | 11/2005 | Parekh et al. | |
| 2005/0254366 A1 | 11/2005 | Amar | |
| 2005/0256768 A1 | 11/2005 | Robinson | |
| 2005/0261062 A1 | 11/2005 | Lewin et al. | |
| 2005/0261962 A1 | 11/2005 | Chuah | |
| 2005/0266906 A1 | 12/2005 | Stevens | |
| 2005/0266907 A1 | 12/2005 | Weston et al. | |
| 2005/0270537 A1 | 12/2005 | Mian et al. | |
| 2005/0283395 A1 | 12/2005 | Lesandrini et al. | |
| 2005/0283401 A1 | 12/2005 | Swix et al. | |
| 2005/0283797 A1 | 12/2005 | Eldering et al. | |
| 2005/0286860 A1 | 12/2005 | Conklin | |
| 2005/0288999 A1 | 12/2005 | Lerner et al. | |
| 2006/0007312 A1 | 1/2006 | James | |
| 2006/0031551 A1 | 2/2006 | Agresta et al. | |
| 2006/0085517 A1 | 4/2006 | Kaurila | |
| 2006/0085816 A1 | 4/2006 | Funk et al. | |
| 2006/0090186 A1 | 4/2006 | Santangelo et al. | |
| 2006/0130095 A1* | 6/2006 | Willis et al. | 725/42 |
| 2006/0143650 A1 | 6/2006 | Tanikawa et al. | |
| 2006/0150249 A1 | 7/2006 | Gassen et al. | |
| 2006/0167747 A1 | 7/2006 | Goodman | |
| 2006/0193471 A1 | 8/2006 | Stehle | |
| 2006/0195859 A1 | 8/2006 | Konig et al. | |
| 2006/0195860 A1 | 8/2006 | Eldering et al. | |
| 2006/0195902 A1 | 8/2006 | King et al. | |
| 2006/0212347 A1 | 9/2006 | Fang et al. | |
| 2006/0212350 A1 | 9/2006 | Ellis et al. | |
| 2006/0230141 A1 | 10/2006 | Willis | |
| 2006/0242667 A1 | 10/2006 | Peterson et al. | |
| 2006/0242703 A1 | 10/2006 | Abeni | |
| 2006/0248209 A1 | 11/2006 | Chiu et al. | |
| 2006/0248569 A1* | 11/2006 | Lienhart et al. | 725/135 |
| 2006/0253323 A1 | 11/2006 | Phan et al. | |
| 2006/0253330 A1 | 11/2006 | Maggio et al. | |
| 2006/0265503 A1 | 11/2006 | Jones et al. | |
| 2006/0268667 A1 | 11/2006 | Jellison et al. | |
| 2006/0294566 A1 | 12/2006 | Zlattner | |
| 2007/0027771 A1 | 2/2007 | Collins et al. | |
| 2007/0038508 A1* | 2/2007 | Jain et al. | 705/14 |
| 2007/0038516 A1 | 2/2007 | Apple et al. | |
| 2007/0038931 A1 | 2/2007 | Allaire et al. | |
| 2007/0050254 A1 | 3/2007 | Driscoll | |
| 2007/0055980 A1 | 3/2007 | Megeid et al. | |
| 2007/0061204 A1 | 3/2007 | Ellis et al. | |
| 2007/0061188 A1* | 3/2007 | Grubbs et al. | 725/35 |
| 2007/0066287 A1 | 3/2007 | Papulov | |
| 2007/0073756 A1 | 3/2007 | Manhas et al. | |
| 2007/0078706 A1 | 4/2007 | van Datta | |
| 2007/0078712 A1 | 4/2007 | Ott et al. | |
| 2007/0078714 A1 | 4/2007 | Ott | |
| 2007/0078989 A1 | 4/2007 | van Datta | |
| 2007/0079326 A1 | 4/2007 | van Datta | |
| 2007/0079331 A1 | 4/2007 | van Datta | |
| 2007/0079335 A1* | 4/2007 | McDonough | 725/58 |
| 2007/0083611 A1 | 4/2007 | Farago et al. | |
| 2007/0089151 A1* | 4/2007 | Moore et al. | 725/132 |
| 2007/0094081 A1 | 4/2007 | Yruski | |
| 2007/0094082 A1 | 4/2007 | Yruski | |
| 2007/0094083 A1 | 4/2007 | Yruski | |
| 2007/0094363 A1 | 4/2007 | Yruski | |
| 2007/0101360 A1 | 5/2007 | Gutta et al. | |
| 2007/0118425 A1 | 5/2007 | Yruski | |
| 2007/0130012 A1 | 6/2007 | Yruski | |
| 2007/0130594 A1 | 6/2007 | Hidary et al. | |
| 2007/0146812 A1 | 6/2007 | Lawton | |
| 2007/0150919 A1 | 6/2007 | Morishita | |
| 2007/0162945 A1* | 7/2007 | Mills | 725/119 |
| 2007/0168288 A1 | 7/2007 | Bozeman | |
| 2007/0174471 A1 | 7/2007 | Van Rossum | |
| 2007/0244760 A1 | 10/2007 | Bodnar et al. | |
| 2007/0294740 A1 | 12/2007 | Drake et al. | |
| 2007/0299935 A1 | 12/2007 | Plastina et al. | |
| 2008/0046948 A1 | 2/2008 | Verosub | |
| 2008/0097872 A1 | 4/2008 | Peckover | |
| 2008/0104106 A1 | 5/2008 | Rosenberg et al. | |
| 2008/0109844 A1* | 5/2008 | Baldeschwieler et al. | 725/35 |
| 2008/0127244 A1 | 5/2008 | Zhang | |
| 2008/0140239 A1 | 6/2008 | Rosenberg et al. | |
| 2008/0140717 A1 | 6/2008 | Rosenberg et al. | |
| 2008/0141372 A1 | 6/2008 | Massey et al. | |
| 2008/0207137 A1 | 8/2008 | Maharajh et al. | |
| 2009/0083788 A1 | 3/2009 | Russell | |
| 2009/0183081 A1 | 7/2009 | Rodriguez | |
| 2009/0204481 A1 | 8/2009 | Navar | |
| 2010/0022310 A1 | 1/2010 | van Datta | |
| 2010/0030640 A1 | 2/2010 | van Datta | |
| 2010/0043022 A1* | 2/2010 | Kaftan | 725/34 |
| 2010/0169910 A1* | 7/2010 | Collins et al. | 725/14 |
| 2010/0269138 A1* | 10/2010 | Krikorian et al. | 725/39 |
| 2011/0004669 A1 | 1/2011 | Navar | |
| 2011/0010545 A1 | 1/2011 | Kill et al. | |
| 2011/0015975 A1 | 1/2011 | Yruski et al. | |
| 2011/0029383 A1 | 2/2011 | Engel et al. | |
| 2011/0125582 A1 | 5/2011 | van Datta | |
| 2013/0232000 A1 | 9/2013 | van Datta | |
| 2013/0232001 A1 | 9/2013 | van Datta | |
| 2013/0297411 A1 | 11/2013 | van Datta | |
| 2014/0019229 A1 | 1/2014 | van Datta | |
| 2014/0019249 A1 | 1/2014 | Nicholas et al. | |
| 2014/0089081 A1 | 3/2014 | Yruski | |
| 2014/0215224 A1 | 7/2014 | Navar | |
| 2014/0304328 A1 | 10/2014 | Capati | |
| 2014/0324576 A1 | 10/2014 | van Datta | |
| 2014/0337882 A1 | 11/2014 | Navar | |

(56) References Cited

U.S. PATENT DOCUMENTS

OTHER PUBLICATIONS

U.S. Appl. No. 11/241,229 Office Action mailed Nov. 19, 2009.
U.S. Appl. No. 12/571,204 Office Action mailed Feb. 28, 2012.
U.S. Appl. No. 11/240,655 Office Action mailed Aug. 5, 2013.
U.S. Appl. No. 11/240,655 Final Office Action mailed Jan. 27, 2010.
U.S. Appl. No. 11/240,655 Office Action mailed Apr. 16, 2009.
U.S. Appl. No. 12/190,323 Final Office Action mailed Feb. 25, 2013.
U.S. Appl. No. 12/190,323 Office Action mailed May 7, 2012.
U.S. Appl. No. 12/190,323 Office Action mailed Jun. 8, 2011.
U.S. Appl. No. 11/535,370 Final Office Action mailed Jun. 8, 2010.
U.S. Appl. No. 11/535,307 Office Action mailed Dec. 10, 2009.
U.S. Appl. No. 11/535,307 Final Action mailed Sep. 8, 2009.
U.S. Appl. No. 11/535,307 Office Action mailed Apr. 16, 2009.
U.S. Appl. No. 13/013,789 Final Office Action mailed Feb. 27, 2013.
U.S. Appl. No. 13/013,789 Office Action mailed Oct. 9, 2012.
U.S. Appl. No. 11/452,848 Final Office Action mailed Feb. 15, 2011.
U.S. Appl. No. 11/452,848 Office Action mailed Sep. 15, 2010.
U.S. Appl. No. 11/452,848 Final Office Action mailed Apr. 21, 2010.
U.S. Appl. No. 11/452,848 Office Action mailed Oct. 20, 2009.
U.S. Appl. No. 11/452,848 Final Office Action mailed Jul. 9, 2009.
U.S. Appl. No. 11/452,848 Office Action mailed Jan. 27, 2009.
U.S. Appl. No. 11/586,990 Final Office Action mailed Apr. 10, 2013.
U.S. Appl. No. 11/586,990 Office Action mailed Nov. 23, 2012.
U.S. Appl. No. 11/586,990 Final Office Action mailed Feb. 14, 2011.
U.S. Appl. No. 11/586,990 Office Action mailed Sep. 15, 2010.
U.S. Appl. No. 11/588,036 Final Office Action mailed Oct. 4, 2012.
U.S. Appl. No. 11/588,036 Office Action mailed Apr. 27, 2012.
U.S. Appl. No. 11/588,036 Final Office Action mailed Feb. 17, 2011.
U.S. Appl. No. 11/588,036 Office Action mailed Sep. 14, 2010.
U.S. Appl. No. 11/586,958 Office Action mailed Mar. 18, 2011.
U.S. Appl. No. 11/586,958 Office Action mailed Sep. 1, 2010.
U.S. Appl. No. 11/586,958 Office Action mailed Dec. 11, 2009.
U.S. Appl. No. 11/586,989 Final Office Action mailed Dec. 9, 2010.
U.S. Appl. No. 11/586,989 Office Action mailed May 11, 2010.
U.S. Appl. No. 11/586,989 Office Action mailed Mar. 30, 2009.
U.S. Appl. No. 11/586,959 Final Office Action mailed Aug. 30, 2013.
U.S. Appl. No. 11/586,959 Office Action mailed May 8, 2013.
U.S. Appl. No. 11/586,959 Final Office Action mailed Oct. 5, 2012.
U.S. Appl. No. 11/586,959 Office Action mailed Apr. 27, 2012.
U.S. Appl. No. 11/586,959 Final Office Action mailed Feb. 14, 2011.
U.S. Appl. No. 11/586,959 Office Action mailed Oct. 1, 2010.
U.S. Appl. No. 12/370,531 Office Action mailed Aug. 1, 2013.
U.S. Appl. No. 12/370,531 Final Office Action mailed Aug. 3, 2011.
U.S. Appl. No. 12/370,531 Final Office Action mailed Aug. 1, 2011.
U.S. Appl. No. 12/370,531 Office Action mailed Feb. 2, 2011.
U.S. Appl. No. 11/588,236 Office Action mailed Sep. 9, 2009.
U.S. Appl. No. 11/588,236 Office Action mailed Mar. 5, 2009.
U.S. Appl. No. 12/703,188 Final Office Action mailed Oct. 12, 2012.
U.S. Appl. No. 12/703,188 Office Action mailed Apr. 6, 2012.
U.S. Appl. No. 10/924,009 Supplemental Final Office Action mailed Feb. 4, 2009.
U.S. Appl. No. 10/924,009 Final Office Action mailed Dec. 5, 2008.
U.S. Appl. No. 10/924,009 Office Action mailed Jun. 30, 2008.
U.S. Appl. No. 12/717,108 Final Office Action mailed Jan. 31, 2012.
U.S. Appl. No. 12/717,108 Final Office Action mailed Jul. 20, 2011.
U.S. Appl. No. 12/717,108 Office Action mailed Feb. 9, 2011.
U.S. Appl. No. 12/782,678 Final Office Action mailed Jul. 31, 2013.
U.S. Appl. No. 12/782,678 Office Action mailed Jan. 7, 2013.
U.S. Appl. No. 12/782,678 Office Action mailed Oct. 4, 2012.
Fontijn, Willem; AmbientDB: P2P Data Management Middleware for Ambient Intelliegence; Year: 2004; IEEE; pp. 1-5.
U.S. Appl. No. 13/939,178 Office Action mailed Oct. 10, 2013.
U.S. Appl. No. 11/240,655 Final Office Action mailed Nov. 14, 2013.
U.S. Appl. No. 11/452,848 Office Action mailed Nov. 18, 2013.
U.S. Appl. No. 14/028,327 Office Action mailed Nov. 7, 2013.
U.S. Appl. No. 11/586,990 Office Action mailed Nov. 20, 2013.
U.S. Appl. No. 11/586,958 Office Action mailed Nov. 6, 2013.
U.S. Appl. No. 11/586,958 Final Office Action mailed Feb. 14, 2011.
U.S. Appl. No. 11/586,958 Office Action mailed Sep. 30, 2010.
U.S. Appl. No. 12/703,188 Office Action mailed Nov. 21, 2013.
U.S. Appl. No. 11/586,959 Office Action mailed Feb. 12, 2014.
U.S. Appl. No. 11/586,958 Final Office Action mailed Mar. 12, 2014.
U.S. Appl. No. 11/586,990 Final Office Action mailed Apr. 7, 2014.
U.S. Appl. No. 11/452,848 Final Office Action mailed Jun. 5, 2014.
U.S. Appl. No. 14/028,327 Final Office Action mailed Jun. 9, 2014.
U.S. Appl. No. 11/588,036 Final Office Action mailed Apr. 15, 2014.
U.S. Appl. No. 13/013,789 Final Office Action mailed Jul. 28, 2014.
U.S. Appl. No. 11/586,959 Final Office Action mailed Jul. 31, 2014.
U.S. Appl. No. 12/703,188 Final Office Action mailed Jul. 14, 2014.
JP 2013-039681, Notification of Reason for Refusal mailed Feb. 12, 2014.
U.S. Appl. No. 11/452,848 Office Action mailed Oct. 23, 2014.
U.S. Appl. No. 14/028,327 Office Action mailed Oct. 8, 2014.
"Statement in Accordance with the Notice from the European Patent Office dated Oct. 1, 2007 Concerning Business Methods" Nov. 1, 2007, XP002456252.
Extended European Search Report for EP 07776856.2 dated Jun. 9, 2011.
JP Notification Reasons for Refusal for JP Application No. 2009-509786 dated Jul. 28, 2011.
U.S. Appl. No. 12/190,323 Final Office Action mailed Nov. 14, 2011.
U.S. Appl. No. 12/370,531 Final Office Action mailed Nov. 16, 2011.
U.S. Appl. No. 12/571,225 Office Action mailed Feb. 2, 2012.
U.S. Appl. No. 13/013,789 Office Action mailed Dec. 20, 2013.
U.S. Appl. No. 11/588,036 Office Action mailed Jan. 6, 2014.
JP 2013-039681, Decision of Refusal dated Feb. 3, 2015.
US 8,689,348, 04/2014, Navar (withdrawn)

* cited by examiner

ADVERTISEMENT ROTATION

CROSS-REFERENCE TO RELATED APPLICATIONS

This application is a divisional of U.S. patent application Ser. No. 12/190,323, filed Aug. 12, 2008, which is a continuation and claims the priority benefit of Patent Cooperation Treaty application number PCT/US07/11059 filed May 7, 2007, which in turn claims the priority benefit of U.S. provisional patent application No. 60/798,381 filed May 5, 2006 and entitled "Advertisement Rotation," the disclosures of which are incorporated herein by reference.

The present application is related to U.S. patent application Ser. No. 11/361,121 filed Feb. 24, 2006, and entitled "Method and System for Providing Auxiliary Content Located on Local Storage During Download/Access of Primary Content Over a Network," which is a continuation and claims the priority benefit of U.S. patent application Ser. No. 09/771,751 filed Jan. 29, 2001 and also entitled "Method and System for Providing Auxiliary Content Located on Local Storage During Download/Access of Primary Content Over a Network." The present application is further related to U.S. patent application Ser. No. 09/452,811 filed Dec. 2, 1999 and entitled "Method and System for Enabling Optional Customer Election of Auxiliary Content Provided on Detachable Local Storage Media." The disclosures of these commonly owned applications are incorporated herein by reference.

BACKGROUND OF THE INVENTION

1. Field of the Invention

The present invention relates, generally, to the management of advertisements displayed on devices connected to a network. More specifically, the present invention relates to the targeted delivery, replacement, display, and statistical reporting of advertisement viewing in a device receiving advertising content while maintaining the relevance and up-to-date status of those advertisements.

2. Background of the Related Art

Traditional advertising outlets such as newspapers and magazines have seen a decrease in demand as "new media" becomes increasingly prevalent. Other forms of conventional media such as broadcast television and radio are also finding themselves subject to this trend with respect to decreased advertising demand and revenues.

The decrease in demand for access to and use of traditional advertising venues is a result, in part, of the rise of the Internet, on-demand video content, and the continued growth of cable and satellite television. The increased popularity of other forms of entertainment—such as interactive and online video games—as well as the continued growth of access to various forms of media content through portable devices are additional contributors to the decline of traditional advertising paradigms.

Notwithstanding this trend, there remains a need for manufacturers and service providers (and their related advertising agencies) to provide the consuming public with information concerning products and services. Consumers—subject to reasonable limitations—also desire to be informed about new and innovative products and services. Without advertising to bridge the gap between consumer and manufacturer, there is a tendency for consumer costs to rise and product demand to fall. Advertising, in that regard, helps maintain an informed public that is aware of and ready to purchase various goods and services while simultaneously helping to mitigate spikes in cost cycles.

Notwithstanding the inherent need for advertising by consumer and manufacturer alike, traditional advertising media ("old media") have become decreasingly effective. As a result, supply-side efforts to reach the consumer have become increasingly difficult. This has proven to be especially true in the case of portable media (e.g., portable digital media devices). In the case of a portable media device and also online gaming, the consumer (user) is often isolated from traditional advertising channels. Thus, notwithstanding the incredible popularity of such devices and online entertainment, a massive consuming public is not being exposed to the goods and services of various advertising entities.

In those instances where the advertiser is able to reach the consumer, it is often with a stale or out-of-date message. For example, a DVD stamped with a series of movie previews quickly becomes out-of-date when the previewed movies are released and subsequently end their theatrical run. Notwithstanding, the advertisement remains embedded on the disc. Various gaming systems suffer from similar drawbacks in that advertising content embedded on the game disc may soon become irrelevant. Consumer demand for focused, relevant, or otherwise personally pertinent advertising content (if such advertising content is desired at all) and advertiser needs for statistical information related to advertisement success only complicates the problem.

As such, there is a need for the delivery of up-to-date advertising content to a variety of media devices and through a variety of services. There is a further need for this content to be as relevant as possible for a particular recipient of the content. There remains yet an additional need for the generation and reporting of statistical information concerning the delivery, display, and effectiveness of content to the creators or sponsors of such content.

SUMMARY OF THE INVENTION

A system and method for delivery of content is disclosed. The system includes at least one data communications network and a client device communicatively coupled to the at least one data communications network. The client user device may be configured to generate indicia of a user of the device. A content server is communicatively coupled to the at least one data communications network and may be configured to deliver primary, ancillary, and/or primary and ancillary content to the aforementioned client device. Certain portions of the content may be determined at least in part by the indicia of the user of the device. Various means for tracking and feedback may also be implemented.

In one embodiment, an apparatus for the display of primary and ancillary content is provided. The apparatus may include at least one source of primary content, the primary content including multiple trigger data points. Each trigger data point indicates a point for the identification, retrieval, and insertion of ancillary advertisement content with respect to the primary content. An advertisement selection module is configured to identify ancillary advertisement content stored in memory. The identification occurs in response to processing of trigger data in the primary content and based upon information associated with a user profile of a current user of the apparatus; the user profile includes user preferences with regard to primary or ancillary content. In accordance with advertisement rotation functionality of the present invention, subsequent processing of the trigger data point may result in identification of different ancillary advertisement content. A decoder is also provided in the apparatus, the decoder being configured to retrieve and decode the ancillary advertisement content in the memory and identified by the advertisement selection module. A graphics processing unit is coupled to the decoder and renders the primary content and the decoded ancillary advertisement content. The ancillary advertisement content is inserted relative to the primary content in accordance with an indication of the trigger data.

A method for the selection and display of content is provided in another embodiment of the present invention. The method includes delivering profile management data from a content display device to a profile management server. The profile management data is associated with a user profile. The method also includes receiving identified ancillary advertisement content at the display device. The ancillary advertisement content is identified based on the user profile. The method further includes storing the ancillary advertisement content at the content display device for subsequent display in response to trigger data processed by the display device. A different selection of ancillary advertisement content is displayed in response to subsequent processing of the trigger data by the display device.

In yet another embodiment of the present invention, a computer-readable storage medium is provided. The storage medium has stored thereon instructions executable by a processor, the instructions corresponding to a method for selection and display of content. The method includes delivering profile management data from a content display device to a profile management server. The profile management data is associated with a user profile. The method also includes receiving identified ancillary advertisement content at the display device. The ancillary advertisement content is identified based on the user profile. The method further includes storing the ancillary advertisement content at the content display device for subsequent display in response to trigger data processed by the display device. Subsequent processing of the trigger data may result in display of a different selection of ancillary advertisement content.

A still further embodiment of the present invention is for a content delivery network. The network includes a client device configured for the receipt and storage of content; a primary content server configured for the delivery of primary content to the client device, wherein the primary content comprises trigger data; an ancillary content server configured for the delivery of ancillary content to the client device; and a profile management server configured to receive profile management data from the client device. The profile management data is associated with a user profile for determining the ancillary content delivered to the client device. The ancillary content is displayed by the client device in response to the processing of the trigger data and each subsequent processing of the trigger data results in the display of a different selection of ancillary content.

Another embodiment of the present invention includes a content decoder for use in a content display device. The content decoder is configured to retrieve and decode ancillary advertisement content from memory accessible to the media display device. The ancillary advertisement content identified by an advertisement selection module, the ancillary advertisement content being for insertion with respect to primary content being rendered on the content display device. The decoder is further configured to provide instructions to a graphics processing unit coupled to the content decoder. The instructions identify how to render the decoded ancillary advertisement content with respect to the primary content, the instructions corresponding to an indication of trigger data in the primary content.

DETAILED DESCRIPTION

Figure 1:
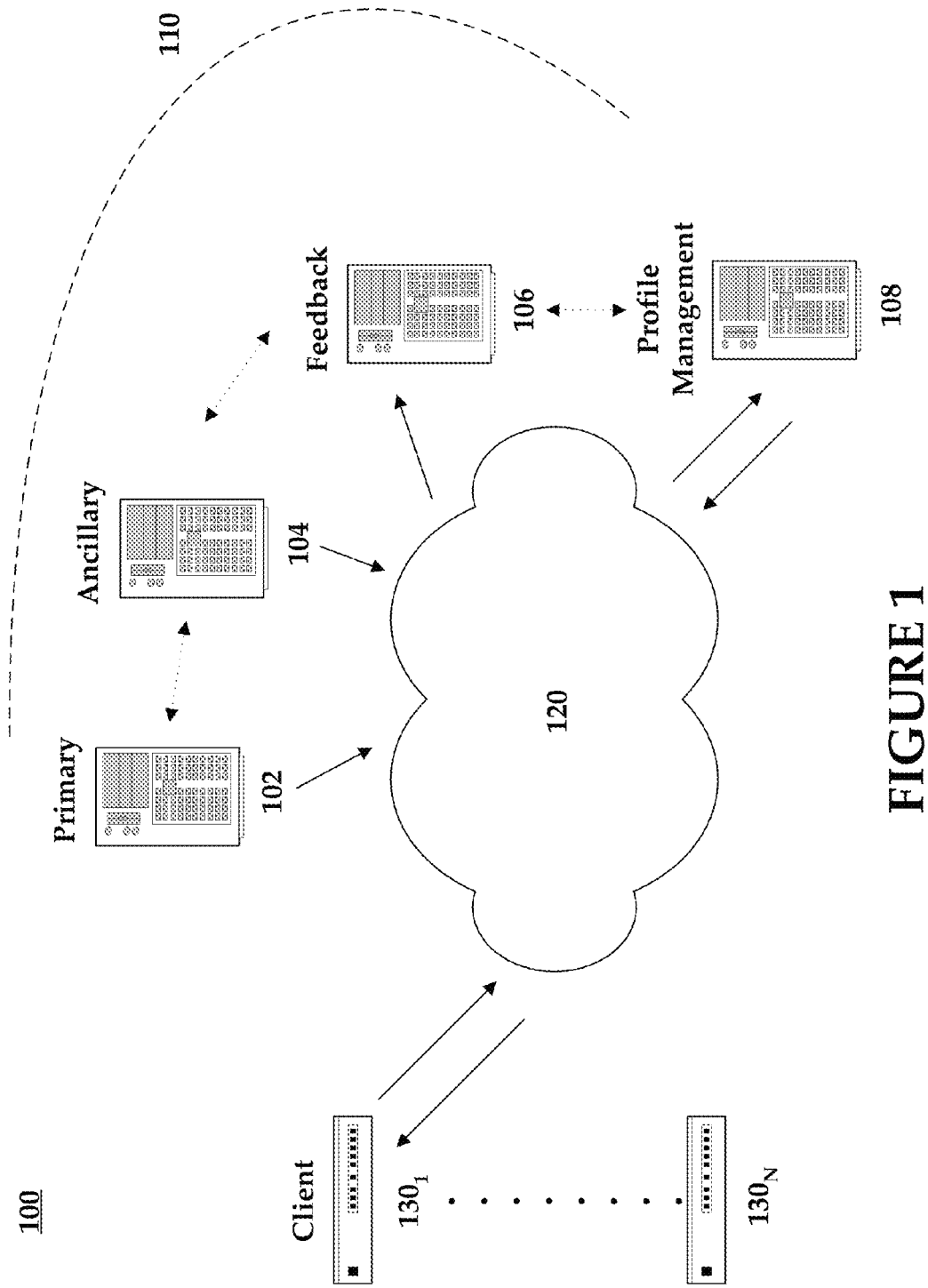
FIG. 1 illustrates an exemplary system for delivery of primary and ancillary content from a server network to a client device with advertisement rotation functionality; exchanges of feedback and profile management data are also disclosed, all of which occur over a communications network.

FIG. 1 illustrates an exemplary system 100 for the delivery of primary and ancillary content to a client device $130_{1 \ldots N}$ from a server network 110 over a communications network 120.

Server network 110 may include any number of specialty servers (i.e., servers configured for a specific task) such as a primary content server 102, an ancillary content server 104, a feedback server 106, and a profile management server 108. In some embodiments of the present invention, the functionalities of the individual servers (102, 104, 106, and 108) may be integrated into a single server. Alternatively, only specific functionalities may be integrated (e.g., the functionalities of primary content server 102 and ancillary content server 106). Servers with such integrated functionalities like those discussed above may be referred to as an integrated server. The server hardware itself may be any computing device as is known in the art.

Any of the aforementioned servers (or an integrated server) may take on certain client-side, cache, or proxy server characteristics. These characteristics may depend on the particular network placement of the server or certain configurations of the server. Balancing, redundancy, and scalability schemes like those disclosed in the U.S. patent application Ser. No. 11/355,237 for a "System and Method for Server Management" (the disclosure of which is incorporated herein by reference) may also be implemented amongst one or more of the servers of server network 110.

Primary content server 102 is a head-end or intermediate computing device (e.g., a cache or proxy server) that may be configured for the delivery of primary content. Primary content may generally be understood to refer to movies, television programs, on-line video programming, Internet radio, any variety of audio files, and the like. Primary content may also be inclusive of various video games that may be accessed via communications network 120. Primary content may include a single title or selection (e.g., a single song, a single video program, or a single video game title or portion thereof) or a collection of programs (e.g., an entire album, several episodes of a television program, different 'chapters' of a single video as it might otherwise appear on a DVD, or various levels of a video game).

Primary content may be inclusive of downloadable content. In some embodiments, primary content may be streamed or subject to progressive download such as HTTP streaming.

Primary content may include, for example, video data such as motion picture data conforming to the MPEG-2 standard. Video data may also conform to the MPEG-4 standard, which supports three-dimensional objects, sprites, text, and other media types. Primary content may also include audio data conforming to, for example, the MP3 format in addition to binary program data or any combination of the above. Primary content should not, however, be construed as being limited to any particular audio or video standard or format.

Primary content (or any content referenced herein) may be transported using any variety of network protocols (e.g., TCP/IP) for establishing any/or maintaining network transport and/or connectivity. In some embodiments, profile management data or certain aspects thereof may be transported utilizing any variety of the aforementioned protocols. Additionally, certain profile management data, metadata, and other various other types of data and information may be embedded in or combined with the primary or ancillary content and/or a transmission of the same. Any such 'embedding' or other combination of different content/data types is not meant to suggest the transformation of primary or ancillary content into, for example, profile management data or vice versa.

Ancillary content server 104 is a head-end or intermediate computing device (e.g., a cache or proxy server) that may be configured for the delivery of certain types of ancillary content, including advertisements and advertisement data. Ancillary content may generally be understood to refer to downloadable content such as video data, audio data, still image data, binary program data, or any combination of the above that is not otherwise primary content or profile management data. One example of ancillary content includes advertisements, which may be made up of video images, animations, sounds, applets, and any other variety of features (e.g., HTML links in an advertisement to a site for purchase of a particular advertised product).

Ancillary content may be related to or associated with the primary content. For example, the primary content may be an episode of the television sitcom Seinfeld. The ancillary content may be a commercial for the release of a particular season of Seinfeld on DVD. Alternatively, the ancillary content may be unrelated to the primary content. In such as case, the primary content may—again—be an episode of the television sitcom Seinfeld. The ancillary content, in this case, may be a movie trailer for a wholly unrelated movie. Various relationships and associations of primary and ancillary content are within the scope of the present invention and discussed herein.

Feedback server 106 is a computing device that may be configured for the accumulation and management of feedback data as it pertains to primary and/or ancillary content. Feedback data may be combined with profile management data for shared delivery to and use by a profile management server 108 and the feedback server 106. Feedback data may also be a separate data set intended for specific delivery to and use by the feedback server 106. The contents of profile management data and its accumulation and subsequent use and/or distribution by the feedback server are described in the context of a feedback module 340 (FIG. 3) and user profile 500 (FIG. 5) management below.

Profile management server 108 is a computing device that may be configured for the management of profile management data. Profile management data may pertain to a particular client device 130 and/or a user who may be associated with a particular client device 130. Profile management data, in one example, may include a USER ID or a similar identifier such as a 'screen name.' This USER ID may pertain to a particular user such as the owner of the client device 130. USER ID may, alternatively, refer to a person who may have access to a particular client device 130 such as a family member or friend of the owner of the client device 130. Profile management data may also include a serial number or other identifier associated with that specific device 130 (e.g., a device identifier).

Profile management data may be a combination of a USER ID and device identifier. For example, a USER ID in combination with one device (such as a PlayStation® Portable) may constitute one set of profile management data (e.g., 'John Doe'—PP125263328-PSP1001). That same USER ID in combination with a different device (such as a PlayStation® 3 entertainment system) may constitute a second set of profile management data (e.g., 'John Doe'—CE133212XXX).

Profile management data may be any form of machine or human readable data. Profile management data may constitute a string of data where each element of datum is reflective of information about the user associated with the data. Various elements of datum may reflect gender, occupation, income, hobbies and interests, preferences as to particular primary and/or ancillary content, and any other demographic information that may be beneficial to advertisers or other entities in targeting various types of content.

Profile management data may be reflected by a data table that identifies a series of characteristics about a particular person. This data table may include, for example, cross-references of user characteristics against other user characteristics. A data table may reflect that a particular user prefers one type of primary content (e.g., comedic movies) but dislikes another (e.g., romantic movies). A simple string of data may reflect that a user does not wish to receive primary content that is deemed a romantic movie. A more complex set of profile management data, however, (e.g., a set as may be indicated in a data table) may reflect that the receipt of primary content that is a comedic movie with romantic undertones (e.g., a romantic comedy) may be acceptable to that particular user. An exemplary user profile data table is shown and described in the context of FIG. 5 below.

Upon receipt of profile management data set (e.g., a USER ID and password) by the profile management server 108, the USER ID may be correlated to an associated account (a user profile) that may encompass any variety of user/device information. This associated information residing at the profile management server 108 may include a detailed data table or complex data string identifying various characteristics and preferences of a particular user and/or various settings, limitations or other characteristics that pertain to a particular device (e.g., presence of certain decoders, processing power, available memory, etc.) associated with that user.

Figure 3:
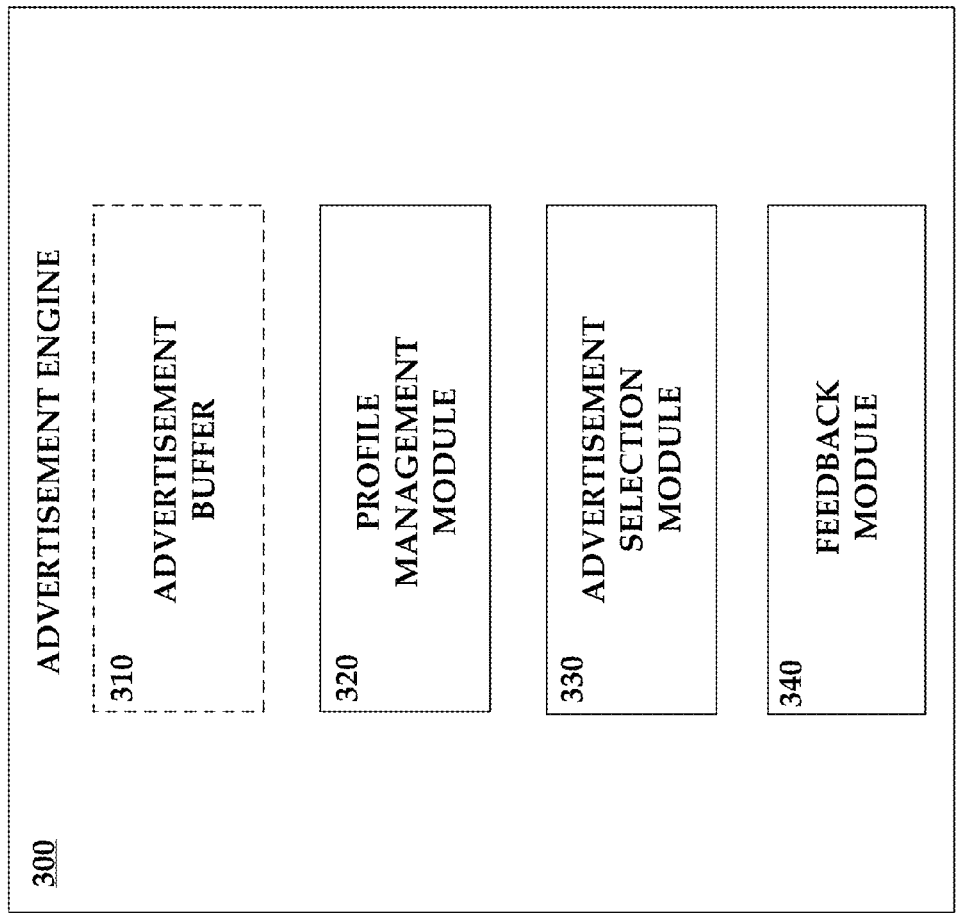
FIG. 3 illustrates an exemplary advertisement engine as disclosed in the schematic of FIG. 2, the advertising engine including an optional advertisement buffer, a profile management module, an advertisement selection module, and a feedback module.

Profile management data may allow for a single client device 130 to be utilized by any number of users but with information specific to that user. For example, the owner of the device 130 may prefer a particular user interface and layout of icons on the device 130. That user's spouse, roommate, or other friend or family member may have a different preference (e.g., background color, images, placement of icons, and various other default settings). In this way, one device 130 may be used by any number of users with specific preferences subject to that user providing, for example, their USER ID. The specific device settings for each user may constitute one form of profile management data as may be managed by profile management module 320 (FIG. 3).

The various servers of server network 110, in addition to any requisite interface means for the delivery of, for example, primary and ancillary content, may also include or be coupled to any requisite storage facilities to host content or any other related data (e.g., a user profile in the case of profile management server 108). For example, primary content server 102, upon the receipt of a request for the delivery of content, may retrieve the requested primary content from local storage and deliver the same to the requesting client device 130. Alternatively, this content may retrieved from a library of content coupled to the primary content server 102. Remote or ancillary data stores may also be used in the context of the remaining servers of server network 110.

In some embodiments, the primary content server 102 may function as an access point and load-balancing/management server. Server 102 may receive various requests for content and then determine the appropriate content server in a content distribution network to be tasked with delivering the content. Similar arrangements may be employed with the other servers of server network 110 and their respective data (e.g., ancillary content server 104).

Communications network 120 includes various communications facilities and mediums (e.g., telephony, wireless, satellite, cable, optic, and so forth) as may be provided by telecommunications companies and Internet Service Providers. Communications network 120 may be a geographically widespread network like the Internet that links various network segments. Network 120 may include a number of smaller linked communications networks such as Local Area Networks (LANs). Each LAN may take on a variety of configurations including server-client, peer-to-peer, peer groups, or any combination of the same.

Client 130 may be one of any number of different client or end-user devices. For example, client 130 may be a set-top box as is commonly associated with cable or satellite television. A set-top box of this nature may comprise digital video recorder (DVR) functionality. Client 130 may also be a home entertainment device such as a PlayStation® 3 from Sony Computer Entertainment Inc. Various other home entertainment devices from various other manufacturers of such equipment may also be used in the present system 100.

Client 130 may also be a home media center capable of playing, for example, digital video discs (DVDs) or other optical, flash or on-demand media, which may further include audio-only content (e.g., CDs) in addition to full-motion video and still-frame content. Client 130 may further be any one of a number of portable media devices such as a PlayStation® Portable™ from Sony Computer Entertainment Inc.

Client 130 is inclusive of any device capable of receiving primary and/or ancillary content over a network or other communications means (e.g., a synchronization operation with another computing device), storing that content locally at the client 130 (or at a storage device coupled to the client 130 such as flash card memory) and exchanging certain profile management data with a server configured for such exchanges (e.g., profile management server 108). In that regard, client 130 may include a mobile device such as a cellular phone, a personal digital assistant (PDA), as well as a laptop or desktop computer.

Figure 2:
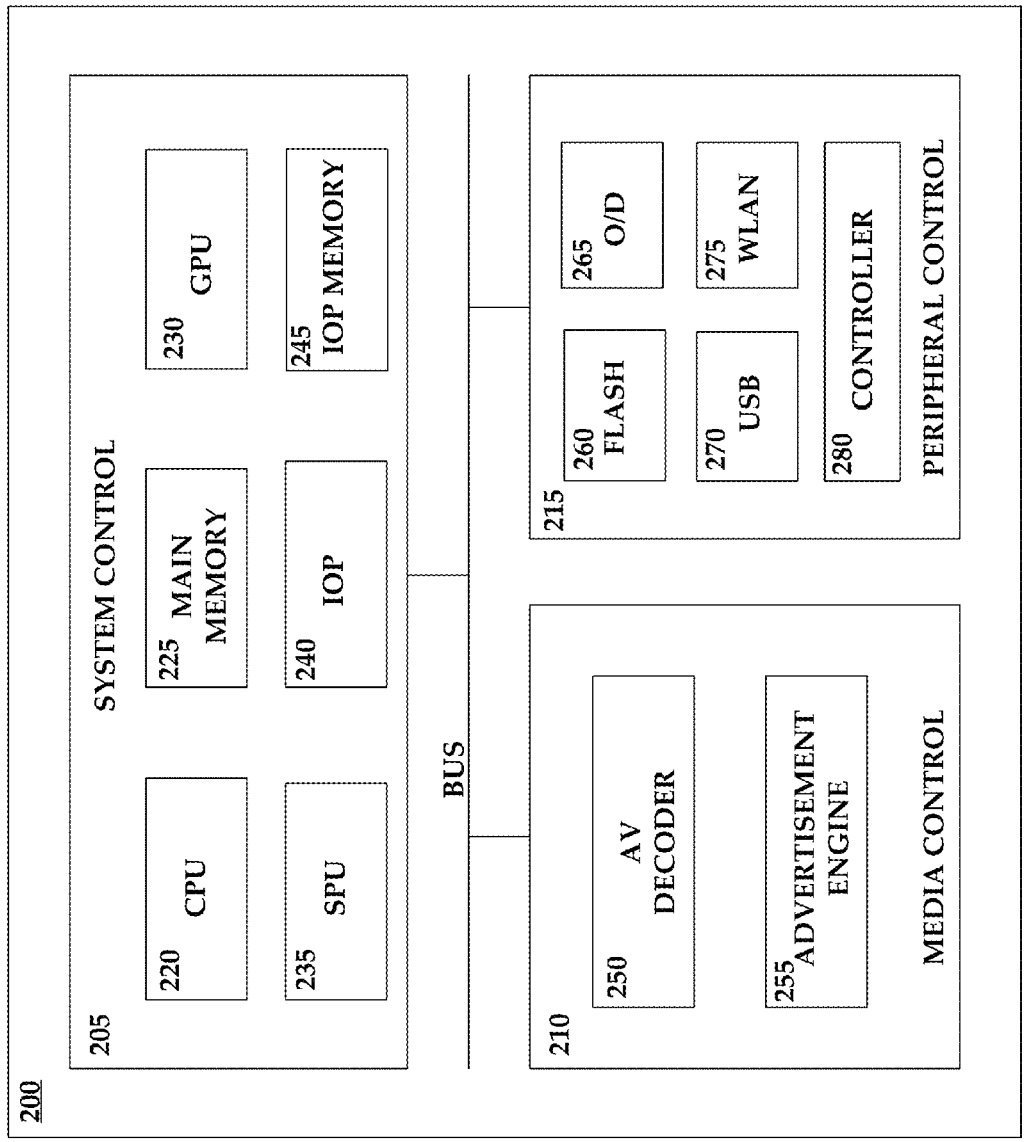
FIG. 2 illustrates an exemplary schematic of a device offering advertisement rotation in accordance with an embodiment of the present invention.

FIG. 2 illustrates an exemplary schematic 200 of a device (e.g., client device 130) offering advertisement rotation in accordance with an embodiment of the present invention. The schematic 200 of FIG. 2 may be implemented in any number of client device 130 including but not limited to a portable media device or cellular phone, a home entertainment system such as a video game console, and any variety of online gaming devices including desktop and laptop computers.

The exemplary client schematic 200 includes system control 205, media control 210, and peripheral control 215. System control 205 may be responsible for fundamental system operations such as start-up, graphic rendering, input/output control, and so forth. Media control 210 may be responsible for handling various audio and video formats including advertisement rotation. Peripheral control 215 may be responsible for the interface of various peripherals with the device.

Various combinations of hardware, software, and computer-executable instructions (e.g., program modules and engines) may be utilized with regard to system control 205, media control 210, and peripheral control 215. Program modules and engines include routines, programs, objects, components, data structures, and the like that may perform particular tasks or implement particular abstract data types. Computer-executable instructions and associated data structures represent examples of the programming means for executing steps of the methods and implementing particular system configurations disclosed herein.

System control 205 as illustrated in FIG. 2 includes a central processing unit (CPU) 220, main memory 225, a graphics processing unit (GPU) 230, sound processing unit (SPU) 235, input/output processor (IOP) 240, and IOP memory 245. The various controls (205, 210, and 215) and the various components therein (e.g., CPU 220 and main memory 225) may be communicatively coupled via a series of buses both dedicated and shared.

CPU 220 may utilize various processor architectures may including those disclosed in U.S. patent publication number 2002-0138637 for a "Computer Architecture and Software Cells for Broadband Networks," the disclosure of which is incorporated herein by reference. CPU 220 may be configured to execute programs stored in an operating system read only memory (OS ROM) (not shown) and main memory 225. Main memory 225 may contain pre-stored programs and/or programs transferred from any variety of interfaces controlled by peripheral control 215 (e.g., from an optical disk via optical disk controller interface 265) via IOP 240. IOP 240 may be configured to control various exchanges between CPU 220 and GPU 230 as well as media control 210 and the aforementioned peripheral control 215. GPU 230 may be configured to execute drawing instructions from the CPU 220 and/or media control 210 to produce images for display on the client device 130. SPU 235 may be configured to execute instructions and processes data to produce sound signals that are output on an audio device (not shown) that may be coupled to or otherwise integrated with device 130.

Media control 210 as illustrated in FIG. 2 is responsible for handling various audio and video formats as may be introduced to a client device 130 implementing exemplary schematic design 200. An AV decoder 250 and advertisement engine 255 are disclosed in the embodiment illustrated in FIG. 2. Media control 210 may further include enhanced dynamic random access memory (not shown) and/or a virtual machine environment (VME) (also not shown) for implementing certain emulation environments to isolate a particular media application from the actual hardware architecture of the device (e.g., an execution 'sandbox').

Through media control 210, a client device 130 may display still images, audio, and video as may be introduced through a variety of peripherals like those under the control of peripheral control 215. Media control 210 may implement various audio formats such as MP3, ATRAC3, WMA, WAV, MP4, and AAC. Media control 210 also implements a variety of video formats including MPEG-4 Part 2 as well as H.264/AVC. Still images may also be implemented through media control 210 in formats such as JPEG, GIF, BMP, TIF, and PNG.

AV decoder 250 may be configured to decompress and/or decodes a variety of media as may be introduced by peripheral control 215. Decompressed media may be temporarily stored in eDRAM (not shown) prior to rendering and/or audible emission by the device 130. The functionalities of advertisement engine 255 are discussed in greater detail in the context of FIG. 3.

Peripheral control 215 as shown in FIG. 2 controls any variety of peripheral input/outputs that may be present on the client device 130. For example, device 130 may utilize flash memory as may be introduced through flash memory interface 260. Optical disc interface 265 may provide for the introduction of data through any variety of optical discs such as CD-ROM or DVD-ROM but may also include proprietary formats such as the Universal Media Disc from Sony Corporation. Peripheral control 215 may further include a USB 2.0 interface 270, which may include a mini-B interface. Client device 130 may also comprise a WLAN interface 275 such that device 130 can exchange data with other computing devices utilizing an 802.11x wireless protocol.

Other data formats may be managed by peripheral control 215 such as data introduced via an optional InfraRed interface as may conform to IRDA standards or a Memory Stick™ interface for an IC-based recording medium like that from Sony Corporation. Device 130 may also include an IEEE 1394 ('FireWire') connection in addition to Bluetooth and Ultra Wideband (UWB) radio technology interfaces. Some embodiments may utilize a network adaptor, which may offer an Ethernet connection and/or telephony connection.

Peripheral control 215 as shown in FIG. 2 also includes controller interface 280 that may be configured for the introduction of instructions through a control device such as a joystick, directional buttons, and other control buttons. Other control input methodologies may be managed by peripheral control 215 such as a USB-camera like the Eye Toy® from Sony Computer Entertainment Inc. A control device (e.g., the aforementioned USB-camera) may sometimes be coupled to the device 130 through a peripheral input such as USB interface 270.

FIG. 3 illustrates an exemplary advertisement engine 300 as initially disclosed in FIG. 2 (255). Advertisement engine 300 may include or be coupled to optional advertisement buffer 310, profile management module 320, advertisement selection module 330, and feedback module 340. Advertisement engine 300, as illustrated in FIG. 3, may be configured to manage advertisement rotation.

Advertisement buffer 310 may be any mass memory device configured to store data (e.g., eDRAM). Computer-readable instructions or data, including application programs and other program modules may be stored in advertisement buffer 310. Advertisement buffer 310 may be used for the storage and retrieval of ancillary content such as advertisements as may be provided by ancillary content server 104.

Content stored in advertisement buffer 310 may be encoded, which may require the intervention of AV decoder 250 (FIG. 2) to render or process that content. AV decoder 250 may include a series of CODECS for the compression and/or decompression of content (including ancillary content stored in advertisement buffer 310).

In some instances, received content may overflow the advertisement buffer 310. Such 'excess' content may be stored on a local auxiliary storage device such as a flash card via flash interface 260 or a Memory Stick™. Certain intelligence in the server network 110 of FIG. 1 and as might be implemented at ancillary content server 104 and/or profile management server 108 may operate to prevent the occurrence of overflow and the need for auxiliary storage of data. For example, profile management server 108 (with knowledge of client 130 capabilities) may operate in conjunction with ancillary content server 104 to ensure that memory is available for the storage of new content based on personal management data and/or reporting of certain device 130 statistics.

Advertisement buffer 310, in some embodiments, may refuse to accept the new content for lack of storage or may utilize a first-in-first-out (FIFO) configuration whereby old content is flushed from the buffer or memory to make room for new content. Some embodiments may utilize advertisement selector 330 in conjunction with various servers of the server network 110 to intelligently dispose of certain content in the advertisement buffer 310 (e.g., low priority content) to make room for incoming high priority content.

Profile management module 320 may be configured to obtain profile management data from a user of the device, maintain certain profile management data concerning the device, and/or to exchange certain profile management data with, for example, profile management server 108. A user of a device 130 may log-in or sign-on using the aforementioned USER ID, a screen name, or some other indicia of the particular user accessing the device 130. Entry of this information may occur through a manual keyboard, a virtual keyboard (as may be displayed on the screen of the device), voice recognition, biometrics, visual profile recognition, and so forth. The particular means of identification will accordingly require certain hardware and/or software to process that identification information (e.g., a voice recognition module for voice-entry, a fingerprint reader for biometric entry, a USB-camera for visual profile recognition). The USER ID may or may not be accompanied by a password that may be entered in a similar fashion.

The profile management module 320 may maintain a library of USER IDs that have been previously entered on the device. The profile management module 320 may allow for 'quick entry' of certain USER ID information by recognizing the first few letters of the USER ID and either automatically completing the USER ID or providing a drop down list of USER IDs that correspond to the partially entered USER ID. The profile management module 320 may also be configured to accept the entry of new USER IDs and provide storage of the same.

Profile management module 320 may be further configured to only allow device access to a particular list of USER IDs. Alternatively, profile management module 320 may be configured to offer limited access to certain device functionality based on the particular USER ID. For example, any user may be able to access time-and-date information on the device but may be prohibited from accessing a communications network whereby pay-for-play content may be accessed or downloaded. Profile management module 320 may be further configured to recognize and accept/deny access to various features or functions based on certain combinations of a USER ID and password. Profile management module 320 may also provide interim or probationary access to certain features or functions until the full range of access by a new USER ID has been confirmed by a verified USER ID such as the owner of the device. Profile management module 320 may also store certain data concerning certain preferences for a USER ID. For example, one particular user may prefer certain screen configurations whereas another user may prefer another particular configuration.

Profile management module 320 may be configured to control the exchange of profile management data with profile management server 108 (FIG. 1). A user may provide a USER ID (and password) during log-in activity with the device. The profile management module 320, after verifying that the particular user (as associated with that particular USER ID) is authorized to access the device and certain functionalities and features thereon, may establish a link with the profile management server 108 to indicate the presence of the aforementioned user. Profile management module 320 may take advantage of a pre-existing communications link or cause, for example, the WLAN interface 275 to initiate a link in response to a user having provided profile management data, namely their USER ID.

The aforementioned communications link with the profile management server 108 need not be established for any particular time period. The exchange of data may occur for as long (or as short) as is necessary. Measurements of network congestion may determine whether a communications link is maintained as may be measured by various response times (e.g., through network 'pings'). The amount of battery power in a device (e.g., a portable device) may also determine how long a communications link is maintained. The number of client devices attempting to log-in to the profile management server 108 may also determine whether a communication link is maintained for an extended period of time. For example, if a large number of client devices are attempting to access the profile management server 108, the profile management server 108 may terminate communication links after the necessary exchange of profile management data has taken place in order to accept new connection requests.

Upon the receipt of profile management data from the profile management module 320 at the profile management server 108, the profile management server 108 may access certain information about a particular user (e.g., a user profile associated with a particular USER ID). An association between profile management data (e.g., a USER ID) and a user profile at the profile management server 108 may be developed in a number of ways.

For example, a user may manually develop a user profile through any number of interfaces, including the device from which the profile management data is provided. A user, after having created a USER ID, may provide certain individual preferences in response to a checklist or other form of query (e.g., a user survey). This information may then automatically populate certain portions of the user profile (e.g., with regard to gender, age, income, etc.) or be analyzed by a human or automated process to identify particular demographics based on an accumulated knowledge base.

A user may also develop a profile at the profile management server 108 through an Internet interface that may be coupled to the profile management server 108. The same questions may be posited through an Internet interface as though they were presented on the aforementioned device. Responding via a desktop or laptop computer, which may have a more manageable keyboard or interface, may be easier than attempting data entry through a portable device, cellular phone or home entertainment system.

A user profile may also be developed through more traditional means such as customer cards that are manually filled out and mailed back to a data entry entity. Information gathered through phone surveys may also be input into the user profile by the party responsible for maintenance of the profile or through a third-party data collection agency. Profile data may also be collected without the immediate knowledge of the user through, for example, credit reports and purchasing habits observed via credit card activity (e.g., data mining) or even through data generated based on playback histories from a DVR or other media device.

Upon having identified the presence of a particular user at a particular client device, the profile management server 108 may share the user profile with a primary content server 102 (FIG. 1) and/or ancillary content server 104 (FIG. 1) via network 102 (FIG. 1), a LAN, or through some other direct communication means (e.g., via a point-to-point connection). Through the receipt of this user profile or certain information related to the same, the primary content server 102 and ancillary content server 104 may be better informed as to what content should be delivered to the user at the client device in order to maximize the user's media experience. Profile management server 108 may also receive information concerning the particular device that the user has accessed (e.g., the profile management data may include both a USER ID and device identification). If a particular device cannot process a particular form of content, that content will not be delivered to the device (e.g., the AV decoder at the device fails to support a particular encoding format). The particular selection and delivery of content is also described in the context of FIG. 5.

In some embodiments, the USER ID as provided at log may also be delivered to the feedback server 106. Alternatively, profile management server 108 may inform the feedback server 106 that a particular user is now online. The feedback server 106 may then begin keeping or updating a feedback profile about a particular user, particular primary content delivered to and/or requested by the user, and/or particular products and/or services that may be advertised in certain ancillary content provided to and/or observed by the user. This feedback profile and the feedback data therein may be utilized by various content providers, manufacturers, and service providers. Feedback data may also be utilized by the profile management server 108 such that a user profile is updated to indicate new preferences that have been observed through user feedback. For example, a user may no longer favor a particular product that was initially indicated as being favored through a survey response that is now six-months old.

Advertisement selection module 330 may be configured to determine which advertisements stored in advertisement buffer 310 are rendered by a device implementing advertisement rotation. Advertisement selection module 330 may identify particular ancillary data content (e.g., advertisements) in the advertisement buffer 310 (or other storage means) based on, for example, some sort of identifying information such as certain header information in the ancillary data. For example, if the content to be rendered happens to be in an HTML format for viewing in a web browser, the ancillary data content might comprise header information that reads:

```
<title>Network Provider Related Advertisement</title>
<meta http-equiv="Content-Type" content="text/html;
charset=windows-1252"/>
<meta name="description"
CONTENT="Universal Ancillary Content">
```

Ancillary content may be provided in any variety of formats. As such, the present reference to an HTML header should not be interpreted as limiting the means by which advertisement selection module 330 identifies content stored in the advertisement buffer 310. Alternative identification data or metadata may be used such as a look-up table referencing particular ancillary content selections. Identification data/metadata may also be used by the advertisement selection module 330 to process ancillary content selections include rendering, removal, and the like.

Various identifying information related to the ancillary (and primary) content may reflect a term of the content such as a rendering life-cycle. Content may be subject to rendering a particular number of times, a certain number of times a day, certain times with regard to certain content, and the like. Upon that particular piece of content having reached the end of its life-cycle, the content may automatically be deleted or left 'unprotected' such that it may be overwritten by new incoming content. In the case of a 'per day' limitation, content may be rendered as called upon until the particular content selection reaches its 'per day' limitation. That particular content selection may then not be rendered again until a new life-cycle begins (e.g., the next day). Certain content may be subjected to numerous term limitations such as a twice-a-day rendering limitation but no more than twenty-times total.

Other content may have an actual expiration date such that when a particular date or time arrives, that content is deleted or is made subject to overwriting by other content. In some embodiments, content may be serial like a news cast. In these instances, the content may remain available until more up-to-date content is available. For example, the 5 PM news may be available for rendering an unlimited number of times until the 6 PM news is available at which time the 5 PM news may be deleted or left unprotected and subject to overwriting by new content (e.g., the 6 PM news).

Expiration and other life-cycle data may be tracked by the advertisement selection module 330 such that this information is taken into account when making advertisement selections of what advertisement may be rendered next. The advertisement selection module 330 may further track the last time an advertisement was rendered such that the same advertisement is not continuously rendered back-to-back when other content is available in the advertisement buffer 310. The advertisement selection module may be configured to maintain an even-rotation of advertisements subject to certain priorities discussed below.

Certain content, subject to copyright and other digital rights management (DRM) concerns may be saved for future viewing notwithstanding the arrival of an expiration date or the like. For example, a user might find a particular commercial amusing and wish to watch it even after its initial life-cycle has expired. In some instances, certain content may be transferable to removable memory such that it may be transported to and used in other devices. Certain content may also be able to be transmitted to other devices subject to certain copyright and DRM limitations (e.g., viral video).

Some content may have a priority designation embedded in its identifying information. For example, a device may have two targeted ancillary content selections in an advertisement buffer 310. The advertisement selection module 330 may then look to see if one piece of content has a higher priority than another (e.g., an advertiser has paid an additional premium to ensure its content is seen before other content). If no priority is given or the content has equal priority, the advertisement selection module 330 may default to a random selection.

If the advertisement selection module 330 has determined that a particular piece of content has reached its expiration date or the end of its life-cycle, the advertisement selection module 330 may cause the device to initiate a request for new ancillary content. In the case of primary content, which may also be governed by the advertisement selection module 330 or by a similar software module with similar functionality but otherwise dedicated to primary content, new primary content may be requested. The advertisement selection module 330 may withhold making this request until a particular piece of content has actually expired. Alternatively, the selection module 330 may anticipate the expiration of content and make a request (subject to memory availability) such that the new content is immediately available for subsequent rendering when the older content expires.

Requests for new content may occur when the user is not using the device such that bandwidth that might be required for other activities (e.g., an ad hoc gaming network) is not consumed by the download of content. Certain high priority content may require a download immediately upon the expiration of certain content. Downloads may also only occur upon a notification from a primary or ancillary content server 102/104 that new content is actually available. This notification may occur through an SMS transmission, a single packet transmission, or some other limited bandwidth communication initiated by a server or other device in the server network 110 for receipt by the device 130 and to otherwise signal the availability of new content—ancillary, primary or both.

As will be discussed further in the context of FIG. 4, primary content accessed by the device from, for example, an optical disc, via a streaming solution, or through download-and-play may include trigger data. Trigger data may indicate to the advertisement selection module 330 that a particular point in the primary content has been reached wherein the selection, loading, and/or rendering of ancillary content may be appropriate. Examples of appropriate points for the insertion of ancillary content may include a point in a television program where a commercial break would occur, the end of a 'chapter' in the case of a DVD, between tracks in a musical selection, or the loading of a new level in the instance of a video game.

Trigger data may indicate that a particular type of ancillary content is to be rendered (e.g., universal (predetermined) or targeted ancillary content as is further discussed herein). In response to an instruction associated with the trigger data, the advertisement selection module 330 may retrieve the appropriate content from the advertisement buffer 310 or some other storage medium based on a review of header or other identification information. The appropriate ancillary content may then be 'inserted' as instructed by the trigger data. Trigger data may also include certain limitations as to the insertion of ancillary content such as time limits, fade-in and fade-out, prohibitions as to certain ancillary and primary content combinations, and the like.

Trigger data may also indicate may also identify a portion of the primary content that is to be simultaneously overlaid with the ancillary content. In this example, primary content may be a movie. Trigger data may result in the 'triggering' of a commercial or some other ancillary content. In some instances, the ancillary may be inserted between scenes or at some other point(s) in the primary content. In this particular example, however, the trigger may indicate that the ancillary content should be overlaid on top of the primary content. In this example, ancillary data (such as an advertisement) may be rendered/displayed concurrently with the primary content.

The ancillary content may be of higher resolution than the primary content in order to stand out from the same. Similarly, the ancillary content may be brighter than the primary content. In some instances, the primary content may be reduced in definition or brightness and the ancillary content remains of otherwise 'standard' quality or brightness. The ancillary content, too, may be of a lesser definition or brightness with respect to the primary content. Instructions with respect to resolution, brightness, or any other characteristics of the ancillary content may be a part of the trigger data or as part of a header file in the ancillary data indicating the proper format for display of that data. This information may also include a particular locale for the display of the content.

In an embodiment overlaying the ancillary content over the primary content, the ancillary content may be a still image in order to avoid overly distracting the viewer from the primary content. Notwithstanding, it is possible to have multiple-frame ancillary content (e.g., from a slideshow-type presentation to full motion video) simultaneously overlaid with respect to the primary content. Certain header data in the primary and/or ancillary content may indicate whether or not certain ancillary content may be displayed in conjunction with primary content. For example, a primary content provider may pay a premium to ensure its content is not interrupted with particular types of content. Likewise, an ancillary content provider may pay a premium to ensure that its content is rendered regardless of the nature of the ancillary content (still frame or video, for example) and the primary content on which it is overlaid.

The ancillary content may also be audio-free such that the listening experience of a user is not interrupted when the ancillary content is rendered with respect to the primary content. Alternatively, the user may be able to utilize some control device (e.g., a control button, touchpad, joystick, etc.) to control whether the audio of the ancillary content is less or greater than the primary content or muted altogether. It some embodiments, the overlaid content may utilize closed captioning to avoid interrupting the audio track of the primary content. In some embodiments, however, the two audio tracks (ancillary and primary) may both be played back simultaneously as a part of the rendering/display process.

In some embodiments, the trigger data (or header data in the content) may indicate that the ancillary content should be displayed adjacent the primary content. This arrangement may result in the creation of dedicated advertisement spaces within content playback. For example, the bottom portion of the screen may be identified as an advertisement area whereby ancillary advertising content is displayed side-by-side (but not overlaid) with respect to the primary content. The aforementioned controls over audio, closed-captioning and the like as discussed with respect to overlaid content are equally applicable to side-by-side content.

Trigger data (and/or header data in the content) may also include instructions with respect to coordinate-specific rendering of content. These coordinates may be applicable to overlays of content and side-by-side displays of content. Further, this coordinate information may provide for (or at least to create the appearance of) the insertion of ancillary content directly into the primary content environment. For example, primary content may show the many billboards of Times Square in New York City. Ancillary content with coordinate information and/or an association to primary content with such information may identify where in the primary content the billboard is positioning. Ancillary advertising content may then be 'inserted' and 'integrated' directly into the primary content environment such that the ancillary advertisement appears to be an actual part of the primary content.

In still further embodiments, header data of content and trigger data may both include instructions with respect to the placement of ancillary content vis-à-vis primary content. These instructions may, in some instances, conflict with one another. For example, the trigger data may indicate that the next rendered selection of ancillary content that is an advertisement should be overlaid on the primary content with certain parameters as they pertain to resolution and the like. The header data of the ancillary content, however, may indicate that the primary content should be re-scaled to make room for a dedicated advertising space in the display whereby a scrolling banner-type ad may be placed.

In these instances, the trigger and/or header data may include an indication as to whether, in the case of conflicting data, which set should govern. For example, one selection of ancillary content may always defer to a conflicting trigger data instruction. Similarly, the trigger data may always defer to the header data. In other instances, trigger, primary and/or ancillary data may have some indication of priority such that a premium movie trumps a five-second advertisement but defers to a nationwide advertisement buy that will be rendered on all media devices incorporation advertisement rotation functionality. In some instances, the determination may be random. For example, in one instance, a particular advertisement's header data may trump a particular instruction associated with trigger data. In a subsequent processing of the trigger data to render the ancillary data, the very same commercial advertisement may defer to the trigger data.

Feedback module 340 may be configured to maintain a record of ancillary content loaded from the advertisement buffer 310 and rendered on a device. Feedback module 340 may be further configured to maintain other forms of information related to the rendering of the ancillary content. For example, the feedback module 340 may record the number of times a particular ancillary content selection was played, the date and time the ancillary content was played, and if there was 'seeking' activity related to the ancillary content (e.g., pause, fast-forward, and rewind). 'Seeking' related information may indicate 'favored' or 'disfavored' portions of the ancillary content. This information may also be associated with the particular user and, if appropriate, the particular device rendering the ancillary content.

In some embodiments, ancillary content may be accessible independent of primary content. For example, a user may view a commercial independent of any larger television program. If a user independently seeks to access such content, the feedback module 340 may record the independent access of the ancillary content in addition to the aforementioned information concerning time, date, seek, and so forth.

Feedback data generated by the feedback module 340 may also indicate whether certain ancillary content was skipped entirely or only partially viewed. In some embodiments of the present invention, the feedback module 340 may employ impression determination functionality as is described in U.S. patent application Ser. No. 11/241,229 entitled "Advertising Impression Determination," the disclosure of which is incorporated herein by reference. Impression determination functionality may be of particular relevance when the client device is a video game console and various objects in the video game environment might be preclude the actual viewing of certain ancillary content.

This advertisement impression function may be implemented as a part of the feedback module 340 or software within another portion of the client device. Notwithstanding the particular locale of impression determination functionality, the feedback module 340 may maintain a record of certain impressions generated. A report to the feedback server 106 may, in turn, reflect that impression data as a part of the transmitted feedback data.

The feedback data generated by the feedback module 340 may be stored locally on the device and transmitted to the feedback server 106 at a suitable time. For example, the transmission of feedback data may occur during the transmission of profile management data. The feedback data may be an integrated or distinct data set in this transmission. Alternatively, the feedback data may be transmitted when a network connection is present but no content or other data is actively being exchanged between the device and another data point. Further, the feedback data may be transmitted immediately following the generation of the data, following the viewing of particular primary or ancillary content, or during a sign-off process from a network connection. The feedback data may be transmitted at a time when the consumption of bandwidth related to the transmission would not interfere with the exchange of other time-sensitive or on-demand data (e.g., during the download of primary content that the user is presently wanting to watch).

Once received by the feedback server 106, the feedback data may be integrated into a feedback profile either through an automated process (e.g., in response to a particular data population format) or through certain inferences made by a knowledge base. Human interaction may also occur with regard to processing and utilizing the feedback record and the feedback profile. This information may be utilized as a basis for assessing fees due by or to various parties. For example, fees may be due to an advertiser for a successful advertisement campaign on behalf of a particular client. Fees may also be due by the user for viewing premium primary content.

Feedback data may also include information generated as a part of a question-answer session at the client via the feedback module 340. For example, the feedback server 106 may independently or as a part of a particular piece of ancillary (or primary) content attach a survey or some other interactive feedback data set. This data set may be translated by the feedback module 340 to generate an interactive survey at the client device (e.g., 'would you buy this product?' or 'was this movie too violent?').

All of the aforementioned feedback data may be integrated with or shared with the entity responsible for overseeing profile management server 108. In some embodiments, certain server functionalities may be integrated including feedback server 106 and profile management server 108. Feedback data entered into a feedback profile may be integrated with or observed with regard to the user profile at the profile management server 108. In this way, a user profile may be kept up-to-date to ensure that a particular user and/or device are receiving the most relevant and appropriate content (both primary and ancillary). For example, if in response to a survey rendered by the feedback module 340 a user indicates that they do not like a particular actor, that information may be used to update the user profile at the profile management server 108 to ensure that the user associated with a particular USER ID no longer receives movies starring that particular actor.

Figure 4:
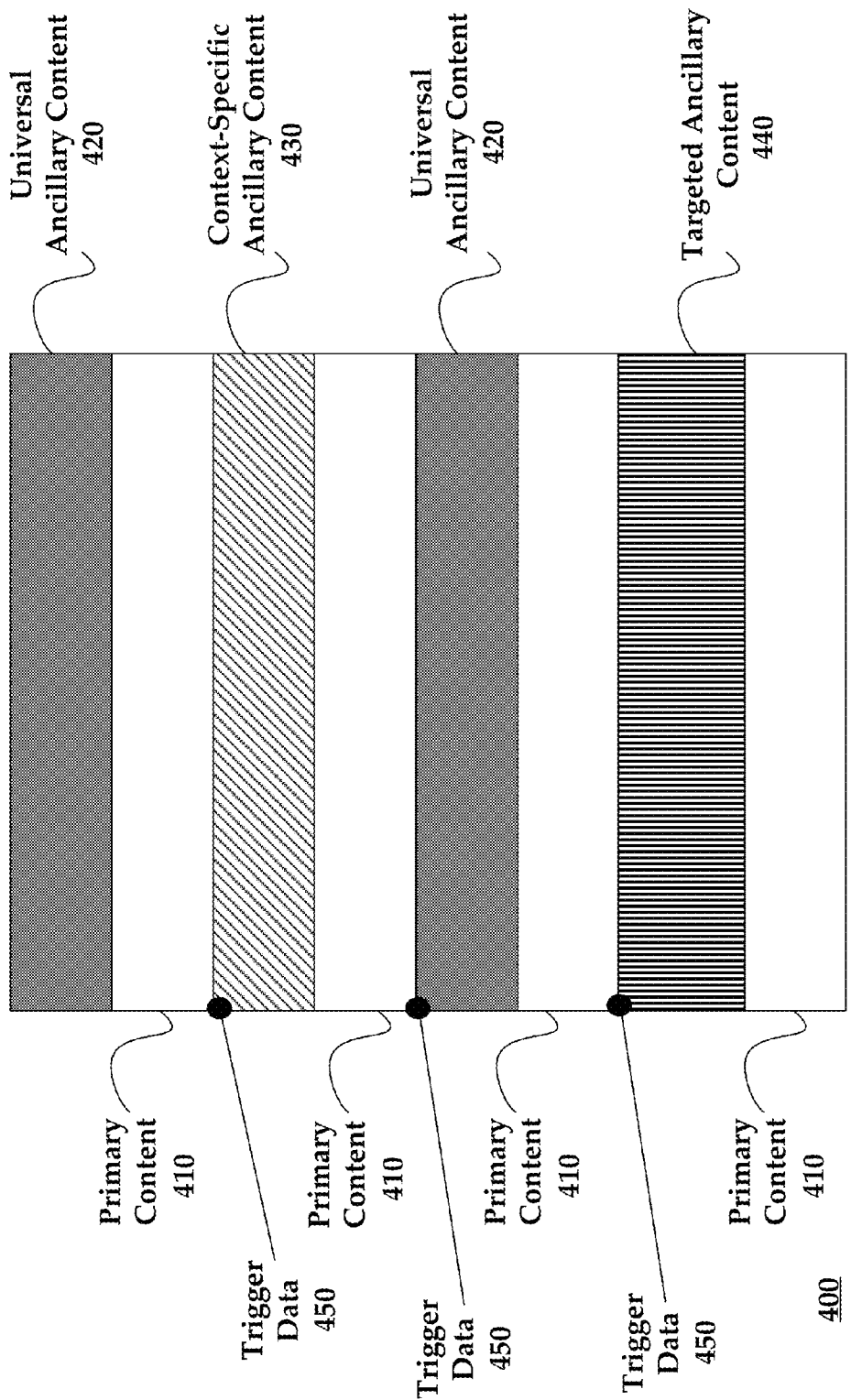
FIG. 4 is an exemplary illustration of primary content including triggers associated with ancillary content including universal, targeted, and context-specific content.

FIG. 4 is an exemplary illustration of primary content including triggers associated with ancillary content. Ancillary content may include universal, targeted, and/or context-specific content. The block form of the primary content is for illustrative purposes only and is not meant to impose any formal structure in the data.

As noted above, primary content 410 may include movies, television programs, on-line video programming, Internet radio, any variety of audio files, video games (which may be accessed via a network or directly at a client device), and the like. Primary content may include a single title or selection (e.g., a single song, a single video program, or a single video game title or portion thereof). Primary content may also include a collection of programs (e.g., an entire album, several episodes of a television program, different 'chapters' of a single video as it might otherwise appear on a DVD, or various levels of a video game).

Primary content 410 may be intermittently 'tagged' by trigger data 450. Trigger data 450 is a data structure recognized by the advertisement selection module 330 as an indication to access and prepare particular ancillary content for playback. As primary content 410 is processed by, for example, the AV decoder 250, the presence of the trigger data 450 will be processed by the advertisement selection module 330 so that the appropriate content may be retrieved from advertisement buffer 310 or some other storage medium. The advertisement selection module 330, in conjunction with the AV decoder 250, may then cause the appropriate ancillary content to be processed by the decoder 250 from the buffer 310 such that the ancillary content appears to be seamlessly 'inserted' within primary content 410.

For example, a user may be watching an episode of the aforementioned Seinfeld sitcom (i.e., primary content 410) from a DVD on a portable media device. The sitcom would, on television, naturally have a series of commercial interruptions. Instead of permanently embedding a particular commercial on the DVD (which may soon become out of date) in these natural commercial interruption areas, the content provider may insert the aforementioned trigger data 450 reflecting that this is an appropriate place to insert a commercial (e.g., ancillary content).

For example, an episode of a television program might be seven-minutes in at which point trigger data 450 is detected by media control 210 via the AV decoder 250 and advertisement engine 255, specifically the advertisement selection module 330. In this instance (assuming FIG. 4 is reflective of the aforementioned episode of Seinfeld), the first trigger data 450 occurrence may reflect the need to load context-specific ancillary content 430. The advertisement selection module 330, in response to this particular trigger, may then access the advertisement buffer 310 to find a particular context-specific ancillary content 430 selection. Certain related calculations as to which selection of content-specific ancillary content 430 may also be made (e.g., if there are two or more selections).

The particular piece of content-specific ancillary content 430 identified by the advertisement selection module 330 may then be loaded from the advertisement buffer 310 or other storage medium into the AV decoder 250 for decoding and rendering on the device by GPU 230. At the termination of the particular piece of content-specific ancillary content 430, the primary content 410 may continue to be rendered as if a television program were returning from commercial.

The process may repeat itself through the rendering of a particular piece of primary content 410 wherein subsequent trigger data 450 indicates it is necessary to identify, load, and render other content such as universal ancillary content 420 and/or targeted ancillary content 440 as is reflected in FIG. 4.

Context-specific ancillary content 430 may be representative of content that is somehow context-related to the primary content 410. For example, if the primary content 410 is a comedy, then the context-related ancillary content may be a movie trailer for an upcoming movie that is also a comedy. Alternatively, the ancillary content may a commercial for a product in a product-line related to the primary content 410 (e.g., another DVD in a series of that is presently being viewed such as an upcoming season of Seinfeld on DVD). Alternatively, the context-specific ancillary content 430 may be a preview for a movie with an actor who happens to appear in the presently viewed primary content 410. Context-specific content 430 may be any content that is somehow related to the primary content 410 currently being viewed or listened to on the client device.

Universal ancillary content 420, on the other hand, may be representative of content that is received regardless of personal preferences or the nature of the primary content 410. For example, universal ancillary content 420 may be a commercial advertisement related to the maker of the client device. Alternatively, the commercial may be from the provider of the network being used to communicate primary and ancillary content (e.g., an ISP or wireless network provider). Alternatively, the universal ancillary content 420 may be a commercial from the movie studio that produced the primary content 410 that is about to be viewed (e.g., a movie preview). Universal ancillary content 420 may be any content that is unrelated to a particular contextual decision or a user preference and that is provided at the election of a content provider versus an end-user.

Targeted ancillary content 440 may be representative of content that is delivered according to the particular likes and dislikes of a user. For example, if a user happens to like romantic comedies, then that user may be received targeted ancillary content 440 that is representative of movie previews that are also for romantic comedies. If the user happens to be a sports fan, the targeted ancillary content 440 may be an advertisement for season tickets for the local baseball team. Certain dislikes may also be taken into account with regard to targeted ancillary content. For example, if a particular user is offended by 'adult' entertainment, a user profile (as may be generated and/or controlled by profile management module 320, profile management server 108 and, in some instances, feedback module 340 and feedback server 106) may help ensure that no 'adult' related content is delivered to that user.

In some embodiments, primary content 410 may only be delivered with embedded trigger data 450 that is related to particular types of ancillary content (e.g., universal 420, context-specific 430, and targeted 440). In other embodiments, primary content 410 may have various forms of ancillary content embedded therein (e.g., a DVD with primary content 410 and a series of actual permanently embedded commercials). That permanently embedded ancillary content may eventually become out-of-date. In such an instance, the trigger data 410 may reflect that new ancillary content is to be inserted to effectively 'overwrite' the older ancillary content. This 'overwriting' of permanently embedded content may be subject to the availability of the newer ancillary content or the expiration of the original embedded ancillary content as might be identified by trigger data 450. In such an instance, the AV decoder 250 may be instructed to 'skip' the old ancillary content that was originally embedded with the primary content 410. Alternatively, the AV decoder 250 may be instructed to simply not decode and render the older content and to render the newer ancillary content instead.

Various means for the 'insertion' of new ancillary content are disclosed in the Kan Ebisawa family of patents: U.S. Pat. No. 6,882,978 for an "Apparatus and Method for Executing a Game Program Having Advertisements Therein"; U.S. Pat. No. 6,782,533 for an "Encrypted Start Signal for Game with Data Substitution in Original Data and Means for Limiting Execution"; and U.S. Pat. No. 6,640,336 for a "Game Machine System, Broadcasting System, Data Distribution System and Method, Program Executing Apparatus and Method." The disclosures of these patents are incorporated herein by reference.

Trigger data 450 may be embedded in the temporal middle or the beginning of a primary content 410 selection. Through early identification of trigger data 450, ancillary content may be selected from the advertisement buffer 310 by the advertisement selection module 330 in advance of when the content is actually needed such that the ancillary content is decoded and ready for display as soon as the primary content 410 comes to an end. If the ancillary content is not retrieved, decoded and buffered until it is actually needed, some devices may experience processing delays (e.g., dead air) between the end of the primary content 410 and the display of the appropriate ancillary content. In some instances, all the trigger data 450 for a particular piece of primary content 410 may be identified at the very outset of the primary content 410. In other embodiments, the trigger data 450 may be identified and processed on an as-needed basis, which may include on-the-fly triggers or anticipatory triggers that load content in advance of actual rendering.

Trigger data 450 may also contain various other pieces of information related to the primary content 410 and/or ancillary content to be rendered in relation thereto. Trigger data 450 may indicate that the primary content 410 is only to be delayed for a particular period of time to allow for the display of ancillary content. For example, if a full-length feature film is being watched, the primary content 410 provider (e.g., the movie distributor) may want a minimal delay between scenes. Thus, the trigger data 450 may reflect that a particular type of ancillary content is to be selected (e.g., targeted ancillary content 440) and that the ancillary content is to be no longer than 20-seconds in length. Thus, if multiple selections of ancillary content are available—one being 45-seconds and another being 10-seconds—the advertisement selection module 330 may retrieve the ancillary content that is appropriate under the circumstances (i.e., the content that is 10-seconds in length). Trigger data 450 may be instructive as to the manipulation and insertion of certain ancillary content as much as it is indicative of need for that content.

Trigger data 450 may also reflect certain limitations on the type of content to be displayed. For example, one movie studio may not want a competing movie studio's products advertised during its movie. Thus, the trigger data 450 may reflect certain prohibitions on the advertisement selection module 330 selecting ancillary content.

Similarly, the advertisement selection module 330 may select or reject particular pieces of ancillary content for display based on, for example, data from the profile management module 320. If two users are associated with the device—a parent and child, for example—different types of content (primary and ancillary) may be received by the device (e.g., child-related content such as G-rated movies and adult-related content such as R-rated movies). It is possible that an advertisement buffer 310 may have ancillary content related to both users in storage at the same time (e.g., an R-rated movie preview and a G-rated movie preview). Based on the profile management data reflecting the present user of the device and as identified by profile management module 320, particular ancillary content selections will be made for the particular user. If trigger data 450 indicates the need to load targeted ancillary content 440, the advertisement selection module 330 may consult the profile management module 320 as to the present user of the device (or that information might have previously been communicated to the advertisement selection module 330) to determine which of the various targeted ancillary content 440 selections presently in the advertisement buffer 310 should be retrieved, decoded and rendered.

Figure 5:
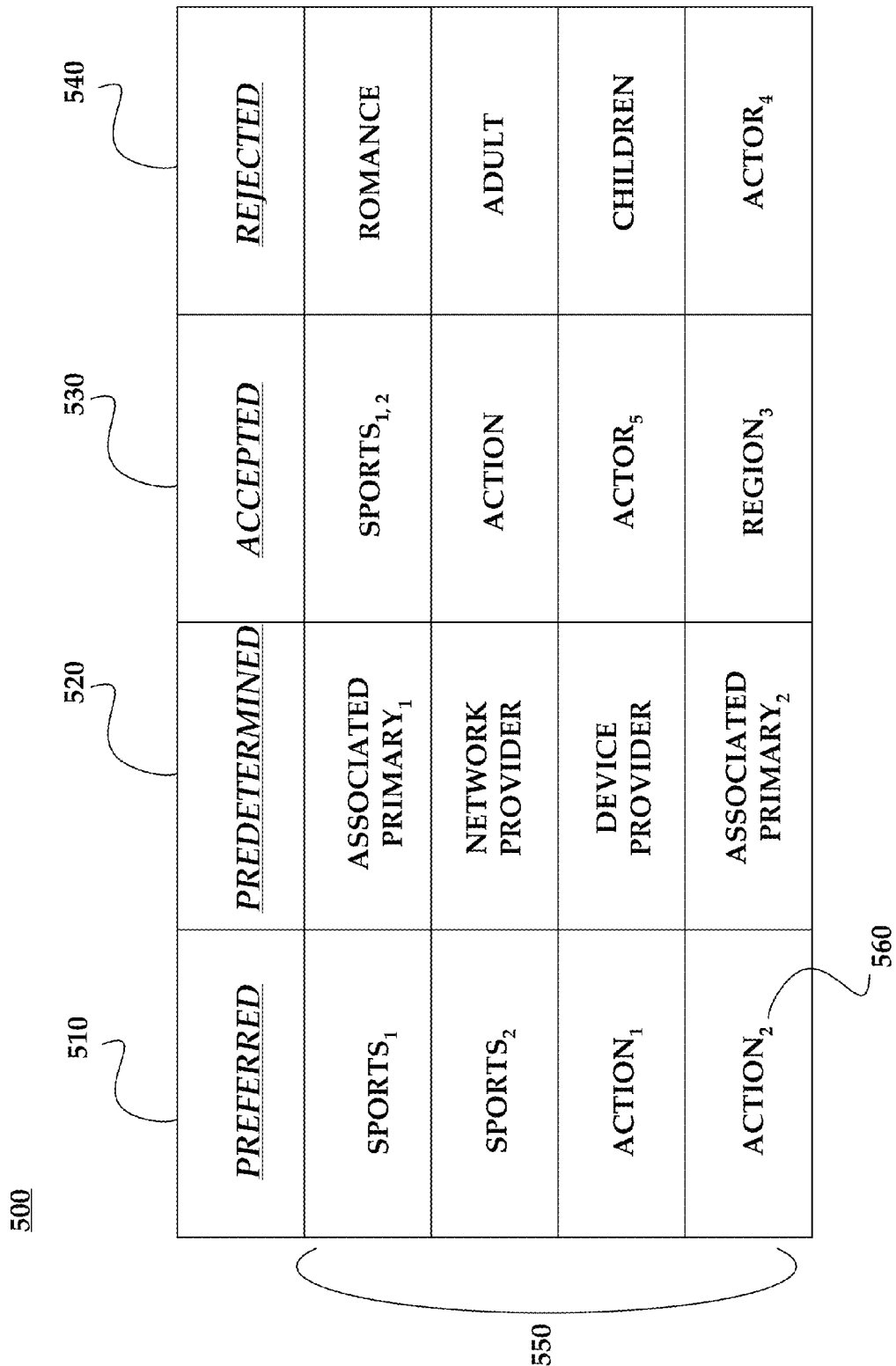
FIG. 5 illustrates an exemplary user profile in table form, which includes various preferred, predetermined, accepted, and rejected content.

FIG. 5 illustrates an exemplary user profile 500 in table form, which includes various preferred, predetermined, accepted, and rejected content preferences. The user profile 500 depicted in FIG. 5 may be a profile stored at profile management server 108 (FIG. 1) or in the context of a feedback profile at feedback server 106 (FIG. 1). User profile 500 may be utilized in the context of selecting and delivering appropriate primary and ancillary content to a user.

User profile 500 may be developed through interactive selections or preference identifications by a user, through feedback data collected by the feedback server 106 or through third-party sources (e.g., purchasing records and the like). The exemplary user profile 500 of FIG. 5 illustrates several exemplary categories of user preferences: preferred content 510, acceptable content 530, and rejected content 540. The fourth category: predetermined content 520 is less of a user-defined preference (e.g., likes or dislikes) but determined with regard to certain conditions of the user or their device.

For example, a user may receive predetermined ancillary content 520 related to a manufacturer of a device (e.g., commercials concerning various peripherals or add-ons) that the user utilizes to receive various forms of content. While there may be a series of other ancillary content packages for other devices (e.g., devices from other manufacturers), the user may only receive ancillary content packages related to that particular device because it is the device the user happens to own. Thus, while the content is customized—it may not be personalized by or for the user.

Preferred content 510 may be representative of that content that the user wants (i.e., prefers to receive). In many instances, preferred content 510 may be specifically identified by the user. Alternatively, certain inferences may be made over time based on, for example, viewing habits as identified through the assistance of feedback module 340 and feedback server 106 and certain identifying information or metadata associated with various content selections.

FIG. 5 illustrates a series of content classifications 550, among them 'sports' and 'action.' Content classifications 550 may be inclusive of various types, brands or classes of content and may be defined by a variety of entities such as the actual content provider, a network provider, or an industry standards group. In the case of FIG. 5, the user profile 500 indicates that a particular user likes sports content and action content. Thus, the user may receive primary and ancillary content related to sporting events and high-action or adventure activities as that content has been similarly identified at the appropriate server (e.g., primary content server 102 or ancillary content server 104).

Content classifications 550 may also be subject to subsidiary classifications 560. For example, 'sports' may represent a broad spectrum of different types of sports. Through the use of subsidiary classifications 560, broader classifications may be made more accurate. For example, 'sports' may be broken down into 'baseball,' 'football,' and 'basketball.'

There is no limit to the number of subsidiary classifications 560 that may be attached to a particular content classification 550. For example, 'sports' may be broken down into 'baseball' as referenced above. 'Baseball' may further be broken down into 'professional,' 'international,' 'minor league,' or 'NCAA®.' 'Professional' could be broken down even further into particular teams, for example, 'Texas Rangers' or 'San Francisco Giants.' The more detailed the subsidiary classifications 560, the more accurate the content ultimately delivered to a user based on a particular profile 500.

No particular organization, structure or hierarchy should be implied as to content classification 550 and subsidiary classifications 560 as illustrated through and discussed in the context of FIG. 5. For example, subsidiary classifications 560 are not meant to be limited to a 'footnote' reference. FIG. 5 is illustrative for the sake of discussion as to help provide a better understanding of the scope of the present invention.

Accepted content 530 may be representative of that content that the user may not necessarily want but otherwise does not have any objection as to receiving. Accepted content 530 may, however, also be inclusive of certain aspects of preferred content 510. Accepted content 530 may be further understood in the context of rejected content 540. Rejected content 540 may be representative of that content that a user does not want to receive either because they have no interest (e.g., a single adult with regard to children's animated movies) or they have a particular objection as to the same (e.g. adult or pornographic content).

If a user identified particular content as rejected content 540, the user will not receive that content. A user may be limited, however, as to the total classifications of content the user may identify as rejected content 540. For example, a user who does not want to receive any commercials could conceivably classify all content as rejected content 540 in an attempt to deny the receipt of any ancillary content. In this regard, a user may only be able to identify a particular number of content types as rejected content 540. Some embodiments may provide for an ancillary content denial option where, for an extra fee or some other form of consideration such as receipt of direct mailings or telephone surveys or lower-quality content (in terms of catalog and visual/audible quality), the user may be able to deny delivery of ancillary content (or specifically advertisements) to their particular client device. Such a feature may be controlled via the user profile 500 or some recognition at primary or ancillary content server 102/104.

Predetermined content 520 may be representative of that content that a user will receive regardless of personal preferences. As this content is universal with respect to recipients (i.e., it may be universally received by all recipients in the network), predetermined content may generally relate to a very specific range of products or services (e.g., the device that a user has accessed or the communications network that the user is utilizing for data exchanges). This narrow focus may be implemented in order to avoid crossing over into products or services that some users might deem offensive. For example, predetermined content may generally refrain from being associated with offensive content such as pornography or products or services that otherwise generate extreme and emotional opinions.

In some instances, certain entities may enter into co-branding opportunities with like-minded organizations. For example, a particular network provider (who normally provides network access to the device) may enter into a co-branding relationship with a company that develops wireless routers or 'network accelerators.' While these products may not be of particular interest to a user, they do have an identifiable common interest with the network provider (i.e., improved network conditions) and thus the predetermined content 520 may be associated with this third-party manufacturer/service provider for delivery as universal content.

Specific types of predetermined content 520 (in the case of ancillary content) may include associated content, which may be representative of content that shares some relationship with the primary content 410 that is being displayed. As has been previously exemplified, a comedy is being watched and the user may receive predetermined ancillary content related to other comedies or other actors in that comedy. Network provider ancillary content may be representative of that ancillary content related to the network provider (e.g., advertisements concerning new-rate plans) whereas device provider ancillary content may be representative of that ancillary content related to the particular device being used for the receipt of content.

The content ultimately delivered may be based on one or more of the data classifications 550 in the user profile 500. For example, the content delivered may be related only to preferred content 510 or may be accepted content 530 subject to rejected content 540. Various cross-references of different types of content may also occur such that certain subsidiary classifications 560 of rejected content 540 are not inadvertently delivered because they might also fall into a classification of accepted content 530. For example, a user might want action movies but not sexual content. If an action movie has sexual content, the user profile 500 and the intelligence manipulating that profile may determine if one factor overrides another with regard to content delivery. Determinations as to content delivery may occur at the various content servers (102/104) or at the profile management server 108. Certain determinations may also be 'outsourced' to third-parties with data analysis returned to the various servers for implementation. The feedback module 340 (FIG. 3) and its interaction with the feedback server 106 (FIG. 1) may also affect the development of the user profile 500 and the resulting content delivered to a user by the content servers 102/104.

Feedback data generated by the feedback module 340 and delivered to the feedback server 106 may play a role in remuneration by advertisers to certain content or network providers (e.g., if content is viewed, then appropriate payment is made). This record, too, may influence the development of the aforementioned user profile 500 wherein if a particular user continuously views certain content (e.g., movies with a particular actor), that information may begin to influence the status of the user profile 500 in terms of that repeated viewing constitutes an implicit acceptance or rejection of content (as may be the case) or even an implicit indication of preferred content 510. These changes to the profile 500 may be automated or subject to a user giving explicit permission on a change-by-change basis or subject to some other cycle for inquiring as to changes of the user profile 500. A user may also grant permissions going forward such that the user profile 500 may be manipulated without inquiring as to the propriety of the same or, alternatively, grant certain permissions as to the types of changes that may be made. For example, changes to accepted content 530 may be permitted automatically but no changes to rejected content 540 may be made without express authorization from the user.

Figure 6:
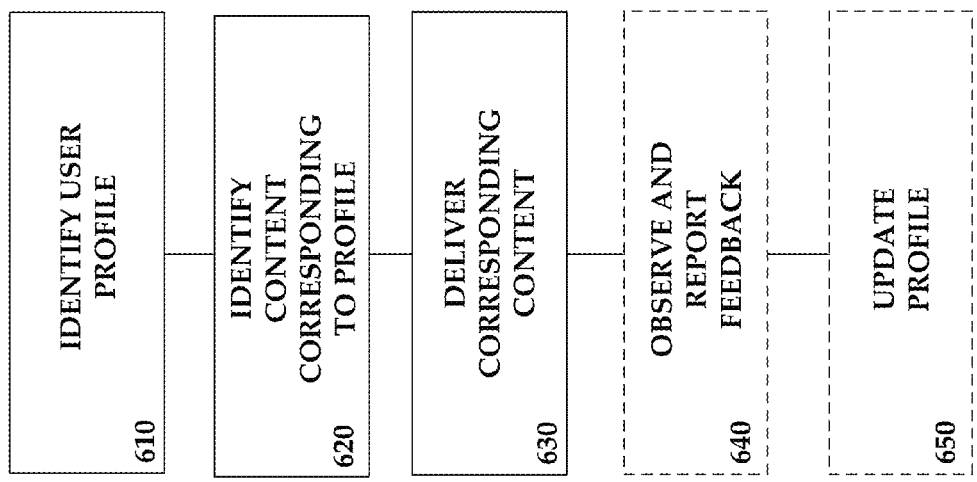
FIG. 6 illustrates an exemplary method for the selection and delivery of content to a device in accordance with one embodiment of the present invention.

FIG. 6 illustrates an exemplary method 600 for the selection and delivery of content to a device in accordance with one embodiment of the present invention. In step 610, a user and/or device is identified via a USER ID, device ID, or some other form and/or combination of identifying information. The identified user may be associated with a user profile that may be stored at the profile management server 108 (FIG. 1).

The user profile at the profile management server 108 may reflect various preferences of a user as seen in the exemplary user profile 500 in FIG. 5. Based on the user profile, particular content (primary and/or ancillary) may be identified for delivery to that user in step 620. For example, if a user prefers sports as reflected by their user profile 500, the user may receive sports-related ancillary content from an ancillary content server 104 (FIG. 1). While a user may normally explicitly identify the primary content that they wish to view, the user profile 500 may be used for the automated delivery of random primary content or to provide a 'suggested' list of primary content for selection by the user, In step 630 the content corresponding to a user profile 500 may be delivered to the user at their respective client device 130 (FIG. 1). This content may be viewed immediately as may be the case with primary content or stored in a buffer or some other storage device for subsequent rendering at an appropriate time as may be the case with ancillary content. The ancillary content may be rendered subject to various advertisement rotation control as governed by the advertisement engine 255 (FIG. 2). The delivery step (630) may also include the replacement of certain expired or less relevant content, which may be primary (e.g., replacement of the downloaded 5 PM news with the 6 PM news) or ancillary (e.g., various advertisements) in nature.

In optional step 640, feedback data may be generated based on various viewing and access activities in addition to certain impression determinations previously described. That feedback data may be delivered to a feedback server 106 (FIG. 1) for further analysis. In optional step 650, a user profile 500 may be updated in accordance with the aforementioned feedback data and/or other profile management data as is appropriate. This updated user profile 500 may be used to identify future selections of content for delivery to the user.

In one embodiment, the advertisement engine 255 may be pre-installed software module on a client device that is delivered by an Original Equipment Manufacturer (OEM). In some instances, however, a user may seek to enjoy advertisement rotation functionality on a legacy device such as an older portable media device, older home entertainment system, or a cellular device.

In these instances involving a legacy client device, the advertisement engine 255 may constitute a downloaded software application that may accompany an initial access of a primary content server 102 (FIG. 1). For example, a user may attempt to contact the primary content server 102 for a particular primary content title. The primary content server 102 may recognize during the initial data exchange or through access to a profile management server 108 that the requesting device does not presently have an advertisement engine 255 in that a profile does not exist or that certain identifying data has not been received by the primary content server 102. In these instance, the advertisement engine 255 software application may be appended to the delivery of primary content (or a portion of the primary content) such that the rendering of the content also results in the automatic installation of the software module (e.g., through a self-executing script) or requires the manual execution and installation of that module prior to the actual content being rendered.

While the profile management module 320, advertisement selection module 330, and feedback module 340 may all be downloaded as software components, buffer memory (i.e., advertisement buffer 310) cannot be 'downloaded.' In an embodiment of the present invention where the advertisement engine 255 and associated advertisement rotation functionality is downloaded after manufacture of the device, the software download may include instructions noting that certain portions of memory in the device are to be reserved for advertisement rotation, specifically, storage of advertisements for rotation.

Legacy device downloads may provide the device with limited or minimal functionality whereby a complex profile of a user may not be developed via the device. In these instances, a user may be required to access to a profile management server 108 via an Internet interface from a workstation separate from the client device. The functionality offered by such a device may, in various instances, be subject to the various hardware and software limitations of the device at issue although it is envisioned that the present invention may be introduced to the fullest extent possible in various legacy devices subject to memory availability and certain hardware specification limitations. In that regard, the present invention envisions the possibility of firmware upgrades to allow for increased or full advertisement rotation functionality in certain legacy devices.

While the present invention has been described with reference to exemplary embodiments, it will be understood by those skilled in the art that various changes may be made and equivalents may be substituted for elements thereof without departing from the true spirit and scope of the present invention. In addition, modifications may be made without departing from the essential teachings of the present invention. Various alternative systems may be utilized to implement the various methodologies described herein and various methods may be used to achieve certain results from the aforementioned systems. Additionally, various functionalities discussed in the context of ancillary content may also be applied to primary content and vice-versa dependent upon the particular needs of content providers and/or the devices at issue.

For example, an embodiment of the present invention may provide for a content decoder for use in a content display device. The content decoder may be configured to retrieve and decode ancillary advertisement content from memory accessible to a media display device hosting the decoder. The decoder may further provide instructions to a graphics processing unit coupled to the content decoder, the instructions identifying how to render decoded ancillary advertisement content with respect to primary content. In this regard, the decoder may handle or be involved with some or all aspects of advertisement decoding, selection, and rendering.

What is claimed is:

1. An apparatus for the display of primary and ancillary content, comprising:
    an interface for receiving primary content, the primary content including trigger data regarding resolution quality, prohibitions as to certain ancillary content corresponding to the primary content and multiple trigger data points, each trigger data point indicating a point for the identification, retrieval, and insertion of ancillary advertisement content with respect to the primary content;
    a processor for executing:
    an advertisement selection module stored in memory, wherein execution of the advertisement selection module selects an advertisement from ancillary advertisement content for insertion at a trigger data point in the primary content based upon a user profile of a current user, the user profile indicating preference regarding ancillary content based on seeking activity indicating that one or more discrete portions of the selected advertisement were favored or disfavored, wherein different ancillary advertisement content is selected for consecutive trigger data points and wherein an order of the different ancillary advertisement content is based on a priority designation in accordance with premium payment, and
    a decoder stored in memory, wherein execution of the decoder decodes the ancillary advertisement content selected by the advertisement selection module; and
    a graphics processing unit coupled to the decoder, the graphics processing unit configured to render the primary content and the decoded ancillary advertisement content, wherein the ancillary advertisement content is inserted relative to the primary content in accordance with the trigger data regarding resolution quality, prohibitions as to certain ancillary advertisement content corresponding to the primary content and a predetermined locale of the ancillary advertisement content on the display, trigger data points and the priority designation of the ancillary advertisement content.

2. The apparatus of claim 1, wherein the trigger data points identify a break between two scenes in the primary content for the insertion of the ancillary advertisement content.

3. The apparatus of claim 1, wherein the trigger data points identify a portion of the primary content for the simultaneous overlay of the ancillary advertisement content.

4. The apparatus of claim 1, wherein the trigger data points include instructions for execution by the graphics processing unit to rescale the primary content whereby the primary content is simultaneously displayed adjacent to the ancillary advertisement content.

5. The apparatus of claim 1, wherein the trigger data points include instructions for execution by the graphics processing unit for coordinate-based placement of the ancillary advertisement content in the primary content.

6. The apparatus of claim 1, wherein the ancillary advertisement content includes header data, the header data identifying a preferred placement of the ancillary advertisement content with respect to the primary content.

7. The apparatus of claim 6, wherein the insertion of the ancillary advertisement content relative to the primary content occurs as a result of a determination of priority with respect to the ancillary advertisement header data and the trigger data points.

8. The apparatus of claim 1, further comprising a profile management module configured to exchange profile management data with a profile management server over a network connection, wherein one or more selections of the ancillary advertisement content in the memory are received by the apparatus over the network.

9. The apparatus of claim 8, wherein the profile management data includes a USER ID.

10. The apparatus of claim 8, wherein the profile management data includes a device identifier.

11. The apparatus of claim 8, wherein the profile management server associates the user profile with the profile management data.

12. The apparatus of claim 11, wherein the ancillary content server delivers ancillary advertisement content to the apparatus over the network in response to one or more user preferences.

13. The apparatus of claim 1, wherein the trigger data is associated with universal ancillary advertisement content.

14. The apparatus of claim 1, wherein the trigger data is associated with targeted ancillary advertisement content.

15. The apparatus of claim 1, wherein the trigger data is associated with context-specific ancillary advertisement content.

16. The apparatus of claim 8, further comprising a feedback module configured to generate feedback data in response to user interaction with the identified ancillary advertisement content.

17. The apparatus of claim 16, wherein the feedback data is used to update a feedback profile at a feedback server.

18. The apparatus of claim 17, wherein the feedback profile is used to update a user profile including user preferences with regard to content.

19. The apparatus of claim 1, wherein the apparatus for the display of primary and ancillary content is a portable media device.

20. The apparatus of claim 1, wherein the apparatus for the display of primary and ancillary content is a home entertainment system.

21. The apparatus of claim 1, wherein the selection of the ancillary advertisement content is further based on associated header information describing a type of the ancillary advertisement content.

22. The apparatus of claim 1, wherein the selection of the ancillary advertisement content is further based on the priority designation.

23. The apparatus of claim 1, wherein the selection of the ancillary advertisement content is further based on life-cycle data associated with the ancillary advertisement content, and wherein the life-cycle data indicates a limit to a number of times an advertisement is allowed to be selected during a predetermined period of time.

24. The apparatus of claim 23, wherein the life-cycle data is tracked by the advertisement selection module.

25. The apparatus of claim 23, wherein the life-cycle data includes an expiration date, and wherein the ancillary advertisement content is deleted or overwritten on the expiration date.

26. The apparatus of claim 24, wherein the advertisement selection module determines that the expiration date has passed and initiates a request for new ancillary advertisement content.

27. The apparatus of claim 26, wherein the request for new ancillary content includes immediate download of content.

28. The apparatus of claim 26, wherein the request for new ancillary content occurs in response to a notification to the user device that new content is available.

29. The apparatus of claim 1, wherein the primary or ancillary content is transferable to removable memory or other devices.

30. A method for the display of primary and ancillary content, the method comprising:

receiving primary content at an interface, the primary content including trigger data regarding resolution quality, prohibitions as to certain ancillary content corresponding to the primary content and multiple trigger data points, each trigger data point indicating a point for the identification, retrieval, and insertion of ancillary advertisement content with respect to the primary content, executing by a processor:

an advertisement selection module stored in memory, wherein execution of the advertisement selection module selects an advertisement from ancillary advertisement content for insertion at a trigger data point in the primary content based upon a user profile of a current user, the user profile indicating preference regarding ancillary content based on seeking activity indicating that one or more discrete portions of the selected advertisement were favored or disfavored, wherein different ancillary advertisement content is selected for consecutive trigger data points and wherein an order of the different ancillary advertisement content is based on a priority designation in accordance with premium payment, and a decoder stored in memory, wherein execution of the decoder decodes the ancillary advertisement content selected by the advertisement selection module; and executing instructions, wherein execution of the instructions by a graphics processing unit coupled to the decoder renders the primary content and the decoded ancillary advertisement content, wherein the ancillary advertisement content is inserted relative to the primary content in accordance with the trigger data regarding resolution quality prohibitions as to certain ancillary advertisement content corresponding to the primary content and a predetermined locale of the ancillary advertisement content on the display, trigger data points and the priority designation of the ancillary advertisement content.

31. A non-transitory computer-readable storage medium having a program embodied thereon, the program executable by a processor to perform a method for the display of primary and ancillary content, the method comprising:

receiving primary content, the primary content including trigger data regarding resolution quality, prohibitions as to certain ancillary content corresponding to the primary content and multiple trigger data points, each trigger data point indicating a point for the identification, retrieval, and insertion of ancillary advertisement content with respect to the primary content;

selecting an advertisement from ancillary advertisement content for insertion at a trigger data point in the primary content based upon a user profile of a current user, the user profile indicating preference regarding ancillary content based on seeking activity indicating that one or more discrete portions of the selected advertisement were favored or disfavored, wherein different ancillary advertisement content is selected for consecutive trigger data points and wherein an order of the different ancillary advertisement content is based on a priority designation in accordance with premium payment;

decoding the ancillary advertisement content selected by the advertisement selection module; and rendering the primary content and the decoded ancillary advertisement content, wherein the ancillary advertisement content is inserted relative to the primary content in accordance with the trigger data regarding resolution quality prohibitions as to certain ancillary advertisement content corresponding to the primary content and a predetermined locale of the ancillary advertisement content on the display, trigger data points, and the priority designation of the ancillary advertisement content.

* * * * *